(12) United States Patent  
Iwadate

(10) Patent No.: US 8,390,860 B2  
(45) Date of Patent: Mar. 5, 2013

(54) IMAGE PROCESSING APPARATUS, METHOD OF CONTROLLING THE SAME, IMAGE PROCESSING SYSTEM, AND STORAGE MEDIUM

(75) Inventor: Masahiro Iwadate, Kawasaki (JP)

(73) Assignee: Canon Kabushiki Kaisha (JP)

( * ) Notice: Subject to any disclaimer, the term of this patent is extended or adjusted under 35 U.S.C. 154(b) by 543 days.

(21) Appl. No.: 12/715,129

(22) Filed: Mar. 1, 2010

(65) Prior Publication Data

US 2010/0220357 A1    Sep. 2, 2010

(30) Foreign Application Priority Data

Feb. 27, 2009   (JP) ................................ 2009-046267

(51) Int. Cl.
*G06F 3/12*    (2006.01)
*G06K 15/00*    (2006.01)

(52) U.S. Cl. ....................... 358/1.15; 358/1.16; 358/1.14

(58) Field of Classification Search .................. None
See application file for complete search history.

(56) References Cited

U.S. PATENT DOCUMENTS

| | | | | |
|---|---|---|---|---|
| 6,031,976 A * | 2/2000 | Koakutsu et al. | ............ | 358/1.16 |
| 7,606,446 B2 | 10/2009 | Kimura | | |
| 8,127,343 B2 * | 2/2012 | Asai | .................. | 726/5 |
| 2004/0156068 A1 | 8/2004 | Yoshida et al. | | |
| 2005/0105122 A1 * | 5/2005 | Sakai | ............................ | 358/1.14 |
| 2007/0148948 A1 | 6/2007 | Tanaka | | |
| 2008/0024835 A1 | 1/2008 | Harano | | |

FOREIGN PATENT DOCUMENTS

| | | |
|---|---|---|
| EP | 1 045 571 A2 | 10/2000 |
| JP | 2005-157558 A | 6/2005 |
| JP | 2006-211229 A | 8/2006 |
| JP | 2008-021007 A | 1/2008 |
| JP | 2008-035269 A | 2/2008 |

OTHER PUBLICATIONS

Extended European Search Report issued in corresponding European Patent Application No. 10154840.2 dated Jul. 19, 2010.

* cited by examiner

*Primary Examiner* — Dov Popovici
(74) *Attorney, Agent, or Firm* — Rossi, Kimms & McDowell LLP

(57) ABSTRACT

An information security managing technique for use when a plurality of image processing apparatuses cooperate with each other to process a single job. In a case where a single job is cooperatively executed by a plurality of image processing apparatuses via a network, an image processing apparatus as a cooperation destination determines whether or not an image deletion level designated by an image processing apparatus as a cooperation source in the job is supported. When the image deletion level is not supported, the cooperation-destination image processing apparatus determines whether or not the job can be executed without using an HDD provided in the cooperation-destination image processing apparatus. When the job can be executed without using the HDD, the cooperation-destination image processing apparatus performs control such that the job is executed without using the HDD.

11 Claims, 42 Drawing Sheets

FIG. 11

| INFORMATION ITEMS IN JOB MANAGEMENT TABLE | VALUES SET IN S501 |
|---|---|
| JOB ID | ASSIGNED VALUE |
| JOB TYPE | FAX RECEPTION |
| JOB RECEPTION TIME | CURRENT TIME |
| JOB PROCESSING STATUS | DATA INPUT |
| FAX RECEPTION INFORMATION | SENDER'S TELEPHONE NUMBER, etc. |
| IMAGE STORAGE INFORMATION | ADDRESS OF IMAGE STORAGE DESTINATION, etc. |
| IMAGE DELETION LEVEL (0/1/2) | VALUE SET IN SELF-APPARATUS |
| IMAGE DELETION CHECK (COOPERATION SOURCE /COOPERATION DESTINATION) | COOPERATION DESTINATION |
| IMAGE DELETION STATE AT SELF-APPARATUS (UNDELETED/DELETED) | UNDELETED |
| IMAGE OUTPUT DESTINATION | — |
| IMAGE TRANSMISSION MODE (MULTI/SINGLE) | MULTI |
| IMAGE DELETION COMPLETION NOTIFICATION FROM COOPERATION DESTINATION (OFF/ON) | — |
| IMAGE DELETION STATE AT COOPERATION DESTINATION (UNDELETED/DELETED) | — |

FIG. 12

| JobStart |
|---|
| COOPERATION SOURCE IP ADDRESS |
| JOB ID |
| JOB TYPE (FAX RECEPTION COOPERATIVE JOB/FAX TRANSMISSION COOPERATIVE JOB) |
| IMAGE TRANSMISSION MODE (MULTI/SINGLE) |
| IMAGE DELETION LEVEL (0/1/2) |
| IMAGE DELETION CHECK (COOPERATION SOURCE /COOPERATION DESTINATION) |
| FAX RECEPTION INFORMATION/FAX TRANSMISSION INFORMATION |

*FIG. 13*

| JobStartAck |
|---|
| STATUS (OK/NG) |
| IMAGE TRANSMISSION MODE (MULTI/SINGLE) |

*FIG. 16*

| JobCompleted |
|---|
| JOB ID |
| STATUS (OK/NG) |
| PAGE COUNT |
| IMAGE DELETION COMPLETION NOTIFICATION (OFF/ON) |

FIG. 17

| INFORMATION ITEMS IN JOB LOG RECORD | VALUES SET IN S705 |
|---|---|
| RECORD NUMBER | NUMBER OF ADDED RECORD |
| JOB ID | VALUE IN JOB MANAGEMENT TABLE |
| JOB TYPE | VALUE IN JOB MANAGEMENT TABLE |
| JOB RECEPTION TIME | VALUE IN JOB MANAGEMENT TABLE |
| FAX RECEPTION INFORMATION | VALUE IN JOB MANAGEMENT TABLE |
| IMAGE OUTPUT DESTINATION | VALUE IN JOB MANAGEMENT TABLE |
| JOB END RESULT | VALUE (STATUS) IN PRINTING COMPLETION NOTIFICATION |
| JOB END TIME | CURRENT TIME |
| PRINT SHEET COUNT | VALUE (PAGE COUNT) IN PRINTING COMPLETION NOTIFICATION |
| IMAGE DELETION STATE AT SELF-APPARATUS | UNDELETED |
| IMAGE DELETION TIME AT SELF-APPARATUS | — |
| IMAGE DELETION STATE AT COOPERATION DESTINATION | UNDELETED |
| IMAGE DELETION TIME AT COOPERATION DESTINATION | — |
| IMAGE DELETION LEVEL (0/1/2) | — |

FIG. 18

| DeleteCompleted |
|---|
| JOB ID |
| IMAGE DELETION LEVEL (0/1/2) |

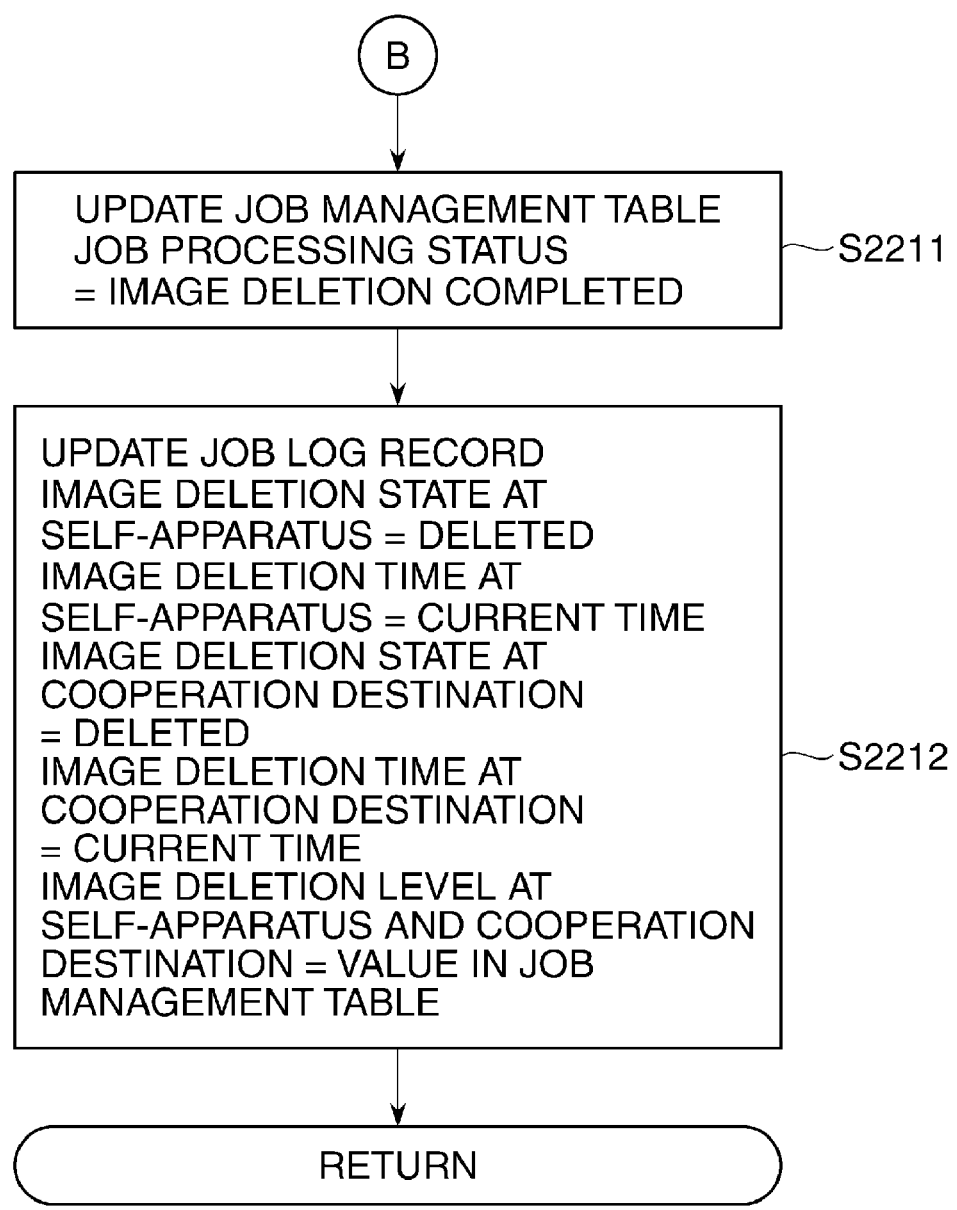

FIG. 23

| INFORMATION ITEMS IN JOB MANAGEMENT TABLE | VALUES SET IN S2001 |
|---|---|
| JOB ID | VALUE DESIGNATED IN JobStart |
| JOB TYPE | VALUE DESIGNATED IN JobStart (FAX RECEPTION) |
| JOB RECEPTION TIME | CURRENT TIME |
| JOB PROCESSING STATUS | JOB RECEPTION |
| FAX RECEPTION INFORMATION | VALUE DESIGNATED IN JobStart |
| IMAGE STORAGE INFORMATION | ADDRESS OF IMAGE STORAGE DESTINATION, etc. |
| IMAGE DELETION LEVEL (0/1/2) | VALUE SET IN SELF-APPARATUS |
| IMAGE DELETION CHECK (COOPERATION SOURCE /COOPERATION DESTINATION) | VALUE DESIGNATED IN JobStart (COOPERATION DESTINATION) |
| IMAGE DELETION STATE AT SELF-APPARATUS (UNDELETED/DELETED) | — |
| IMAGE INPUT SOURCE | VALUE DESIGNATED IN JobStart |
| HDD STORAGE (ON/OFF) | — |
| IMAGE DELETION STATE AT COOPERATION SOURCE (UNDELETED/DELETED) | — |

FIG. 24

| INFORMATION ITEMS IN JOB LOG RECORD | VALUES SET IN S2108 |
|---|---|
| RECORD NUMBER | NUMBER OF ADDED RECORD |
| JOB ID | VALUE IN JOB MANAGEMENT TABLE |
| JOB TYPE | VALUE IN JOB MANAGEMENT TABLE |
| JOB RECEPTION TIME | VALUE IN JOB MANAGEMENT TABLE |
| FAX RECEPTION INFORMATION | VALUE IN JOB MANAGEMENT TABLE |
| IMAGE OUTPUT DESTINATION | VALUE INDICATIVE OF SELF-APPARATUS (COOPERATION DESTINATION) |
| JOB END RESULT | PRINTING RESULT |
| JOB END TIME | CURRENT TIME |
| PRINT SHEET COUNT | PRINT SHEET COUNT |
| IMAGE DELETION STATE AT SELF-APPARATUS | UNDELETED |
| IMAGE DELETION TIME AT SELF-APPARATUS | — |
| IMAGE DELETION STATE AT COOPERATION DESTINATION | UNDELETED |
| IMAGE DELETION TIME AT COOPERATION DESTINATION | — |
| IMAGE DELETION LEVEL (0/1/2) | — |

FIG. 26

TIME POINT CORRESPONDING TO S2108 IN FIG. 21

| NO | JOB ID | JOB TYPE | RECEP-TION TIME | SENDER'S TEL | PRINTING RESULT | END TIME | SHEET COUNT | IMAGE DELETION | DELETION TIME | LEVEL |
|---|---|---|---|---|---|---|---|---|---|---|
| 1 | 1001 | FAX RECEP-TION | 6/1 10:02 | 1111111 | OK | 6/1 10:04 | 10 | SELF-APPARATUS = UNDELETED COOPERATION SOURCE = UNDELETED | — | — |

FIG. 27

TIME POINT CORRESPONDING TO S2212 IN FIG. 22

| NO | JOB ID | JOB TYPE | RECEP-TION TIME | SENDER'S TEL | PRINTING RESULT | END TIME | SHEET COUNT | IMAGE DELETION | DELETION TIME | DELETION LEVEL |
|----|--------|----------|-----------------|--------------|-----------------|----------|-------------|----------------|---------------|----------------|
| 1 | 1001 | FAX RECEP-TION | 6/1 10:02 | 1111111 | OK | 6/1 10:04 | 10 | SELF-APPARATUS = DELETED COOPERATION SOURCE = DELETED | 6/1 10:05 | 2 |

FIG. 30

| INFORMATION ITEMS IN JOB MANAGEMENT TABLE | VALUES SET IN S501 |
|---|---|
| JOB ID | ASSIGNED VALUE |
| JOB TYPE | FAX TRANSMISSION |
| JOB RECEPTION TIME | CURRENT TIME |
| JOB PROCESSING STATUS | DATA INPUT |
| FAX TRANSMISSION INFORMATION | RECEIVER'S TELEPHONE NUMBER, ETC. |
| IMAGE STORAGE INFORMATION | ADDRESS OF IMAGE STORAGE DESTINATION, ETC. |
| IMAGE DELETION LEVEL (0/1/2) | VALUE SET IN SELF-APPARATUS |
| IMAGE DELETION CHECK (COOPERATION SOURCE /COOPERATION DESTINATION) | COOPERATION SOURCE |
| IMAGE DELETION STATE AT SELF-APPARATUS (UNDELETED/DELETED) | UNDELETED |
| IMAGE OUTPUT DESTINATION | — |
| IMAGE TRANSMISSION MODE (MULTI/SINGLE) | MULTI |
| IMAGE DELETION COMPLETION NOTIFICATION FROM COOPERATION DESTINATION (OFF/ON) | — |
| IMAGE DELETION STATE AT COOPERATION DESTINATION (UNDELETED/DELETED) | — |

FIG. 32

| INFORMATION ITEMS IN JOB LOG RECORD | VALUES SET IN S705 |
|---|---|
| RECORD NUMBER | NUMBER OF ADDED RECORD |
| JOB ID | VALUE IN JOB MANAGEMENT TABLE |
| JOB TYPE | VALUE IN JOB MANAGEMENT TABLE |
| JOB RECEPTION TIME | VALUE IN JOB MANAGEMENT TABLE |
| FAX TRANSMISSION INFORMATION | VALUE IN JOB MANAGEMENT TABLE |
| IMAGE OUTPUT DESTINATION | VALUE IN JOB MANAGEMENT TABLE |
| JOB END RESULT | VALUE (STATUS) IN FAX TRANSMISSION COMPLETION NOTIFICATION |
| JOB END TIME | CURRENT TIME |
| FAX TRANSMISSION SHEET COUNT | VALUE (PAGE COUNT) IN FAX TRANSMISSION COMPLETION NOTIFICATION |
| IMAGE DELETION STATE AT SELF-APPARATUS | UNDELETED |
| IMAGE DELETION TIME AT SELF-APPARATUS | — |
| IMAGE DELETION STATE AT COOPERATION DESTINATION | UNDELETED |
| IMAGE DELETION TIME AT COOPERATION DESTINATION | — |
| IMAGE DELETION LEVEL (0/1/2) | — |

FIG. 33

| INFORMATION ITEMS IN JOB MANAGEMENT TABLE | VALUES SET IN S2001 |
|---|---|
| JOB ID | VALUE DESIGNATED IN JobStart |
| JOB TYPE | VALUE DESIGNATED IN JobStart (FAX TRANSMISSION) |
| JOB RECEPTION TIME | CURRENT TIME |
| JOB PROCESSING STATUS | JOB RECEPTION |
| FAX TRANSMISSION INFORMATION | VALUE DESIGNATED IN JobStart |
| IMAGE STORAGE INFORMATION | ADDRESS OF IMAGE STORAGE DESTINATION, etc. |
| IMAGE DELETION LEVEL (0/1/2) | VALUE SET IN SELF-APPARATUS |
| IMAGE DELETION CHECK (COOPERATION SOURCE /COOPERATION DESTINATION) | VALUE DESIGNATED IN JobStart (COOPERATION SOURCE) |
| IMAGE DELETION STATE AT SELF-APPARATUS (UNDELETED/DELETED) | — |
| IMAGE INPUT SOURCE | VALUE DESIGNATED IN JobStart |
| HDD STORAGE (ON/OFF) | — |
| IMAGE DELETION STATE AT COOPERATION SOURCE (UNDELETED/DELETED) | — |

FIG. 35

| INFORMATION ITEMS IN JOB LOG RECORD | VALUES SET IN S2108 |
|---|---|
| RECORD NUMBER | NUMBER OF ADDED RECORD |
| JOB ID | VALUE IN JOB MANAGEMENT TABLE |
| JOB TYPE | VALUE IN JOB MANAGEMENT TABLE |
| JOB RECEPTION TIME | VALUE IN JOB MANAGEMENT TABLE |
| FAX TRANSMISSION INFORMATION | VALUE IN JOB MANAGEMENT TABLE |
| IMAGE OUTPUT DESTINATION | VALUE INDICATIVE OF SELF-APPARATUS (COOPERATION DESTINATION) |
| JOB END RESULT | FAX TRANSMISSION RESULT |
| JOB END TIME | CURRENT TIME |
| FAX TRANSMISSION SHEET COUNT | FAX TRANSMISSION SHEET COUNT |
| IMAGE DELETION STATE AT SELF-APPARATUS | UNDELETED |
| IMAGE DELETION TIME AT SELF-APPARATUS | — |
| IMAGE DELETION STATE AT COOPERATION DESTINATION | UNDELETED |
| IMAGE DELETION TIME AT COOPERATION DESTINATION | — |
| IMAGE DELETION LEVEL (0/1/2) | — |

FIG. 38

TIME POINT CORRESPONDING TO S3105 IN FIG. 31

| NO | JOB ID | JOB TYPE | RECEP-TION TIME | SENDER'S TEL | FAX TRANS-MISSION RESULT | END TIME | SHEET COUNT | IMAGE DELETION | DELETION TIME | DELETION LEVEL |
|---|---|---|---|---|---|---|---|---|---|---|
| 1 | 2001 | FAX TRANS-MISSION | 6/2 15:35 | 2222222 | OK | 6/2 15:36 | 5 | SELF-APPARATUS = UNDELETED COOPERATION SOURCE = UNDELETED | — | — |

FIG. 39

TIME POINT CORRESPONDING TO S907 IN FIG. 9B

| NO | JOB ID | JOB TYPE | RECEPTION TIME | SENDER'S TEL | FAX TRANS-MISSION RESULT | END TIME | SHEET COUNT | IMAGE DELETION | DELETION TIME | LEVEL |
|---|---|---|---|---|---|---|---|---|---|---|
| 1 | 2001 | FAX TRANS-MISSION | 6/2 15:35 | 2222222 | OK | 6/2 15:36 | 5 | SELF-APPARATUS = DELETED COOPERATION DESTINATION = DELETED | 6/2 15:37 | 2 |

IMAGE PROCESSING APPARATUS, METHOD OF CONTROLLING THE SAME, IMAGE PROCESSING SYSTEM, AND STORAGE MEDIUM

BACKGROUND OF THE INVENTION

1. Field of the Invention

The present invention relates to an information security managing technique for use when a plurality of image processing apparatuses cooperate with each other to process a single job.

2. Description of the Related Art

As to a method of deleting image data stored in an image processing apparatus, there has conventionally been proposed an image forming system in which security level information is exchanged in advance between a plurality of image processing apparatuses linked to each other, to thereby enable the image processing apparatuses to operate at the same security level (see Japanese Patent Laid-Open Publication No. 2008-035269).

Further, as to a method of checking deletion of image data, there has been proposed an image processing apparatus in which the status of deletion of image data is recorded in a job log to thereby enable a user to check the status of the deletion (see Japanese Patent Laid-Open Publication No. 2006-211229).

However, in a case where a plurality of image processing apparatuses execute a single job in a cooperative manner, the methods disclosed in Japanese Patent Laid-Open Publication No. 2008-035269 and Japanese Patent Laid-Open Publication No. 2006-211229 suffer from the following problems:

In Japanese Patent Laid-Open Publication No. 2008-035269, an image processing apparatus as a cooperation source operates according to the security level of an image processing apparatus as a cooperation destination. For this reason, even if the cooperation-source image processing apparatus supports a high-security deletion method, when the cooperation-destination image processing apparatus supports only a low-security deletion method, the cooperation-source image processing apparatus is required to delete image data according to the low-security deletion method. Therefore, in a whole system including the cooperation-source and cooperation-destination image processing apparatuses, information security cannot be fully maintained.

When deletion check according to Japanese Patent Laid-Open Publication No. 2006-211229 is performed in a case where a plurality of image processing apparatuses cooperate with each other to execute a single job, the following problem occurs: In the mentioned case, a cooperation-source image processing apparatus and a cooperation-destination image processing apparatus are generally disposed at respective locations remote from each other, and further, users of the cooperation-source and cooperation-destination image processing apparatuses are usually not near the image processing apparatuses they use. Therefore, each user has to go to a place where is installed an image processing apparatuses on which the user desires to perform deletion check. This is troublesome for the user.

Furthermore, e.g. in a cooperative job in which facsimile image data (hereinafter referred to as "FAX data") received by an image processing apparatus A is transferred to an image processing apparatus B and is printed thereby, the image processing apparatus A only functions as a mere relay apparatus. Consequently, in many cases, a user of the image processing apparatus A does not know even a fact that the image processing apparatus A has relayed FAX data, and therefore it is more convenient that a user of the image processing apparatus B checks print processing and carries out deletion check using the image processing apparatus B.

On the other hand, in a cooperative job in which image data scanned by the image processing apparatus A is transferred to the image processing apparatus B and is then further sent to another apparatus by FAX transmission, the image processing apparatus B only functions as a relay apparatus. Consequently, in many cases, the user of the image processing apparatus B does not know even a fact that the image processing apparatus B has relayed the image data, and therefore it is more convenient that the user of the image processing apparatus A checks scan processing and carries out deletion check using the image processing apparatus A.

As described above, which of a cooperation-source image processing apparatus and a cooperation-destination image processing apparatus should be selected for more convenient image data deletion check depends on the settings of a cooperative job. Therefore, even if the cooperation-source image processing apparatus and the cooperation-destination image processing apparatus are both configured to be capable of performing deletion check, very little merit can be expected.

SUMMARY OF THE INVENTION

The present invention enables an image processing apparatus as a cooperation source and an image processing apparatus as a cooperation destination to improve information security in their entirety in a case where a plurality of image processing apparatuses execute a single job in a cooperative manner.

In a first aspect of the present invention, there is provided an image processing apparatus which functions as a destination device in a case where a single job is cooperatively executed by a plurality of image processing apparatuses, including the claimed image processing apparatus, via a network, comprising a first determining unit configured to determine whether or not the claimed image processing apparatus supports an image deletion method designated in the job by a source image processing apparatus, a second determining unit operable in a case that the first determining unit determines that the claimed image processing apparatus does not support the image deletion method designated by the source image processing apparatus, to determine whether or not the job can be executed without using a specific storage medium provided in the claimed image processing apparatus, and a control unit operable, in a case that the second determining unit determines that the job can be executed without using the specific storage medium, to perform control such that the job is executed without using the specific storage medium.

In a second aspect of the present invention, there is provided an image processing system in which a single job is cooperatively executed by a plurality of image processing apparatuses via a network, the plurality of image processing apparatus comprising a source image processing apparatus and a destination image processing apparatus, wherein the source image processing apparatus functions as a source device for the job, and the source image processing apparatus comprises a designation unit configured to designate a deletion method for deleting image data associated with the job, for the destination image processing apparatus which functions as a destination device for the job, and wherein the destination image processing apparatus comprises a first determining unit configured to determine whether or not the destination image processing apparatus supports the deletion method designated by the designation unit, a second determining unit operable, in a case that the first determining unit determines that the destination image processing apparatus does not support the deletion method designated by the designation unit, to determine whether or not the job can be executed without using a specific storage medium provided in the destination image processing apparatus, and a control unit operable, in a case that the second determining unit determines that the job can be executed without using the specific storage medium, to perform control such that the job is executed without using the specific storage medium.

In a third aspect of the present invention, there is provided a method of controlling an image processing apparatus which functions as a destination device in a case where a single job is cooperatively executed by a plurality of image processing apparatuses, including the controlled image processing apparatus, via a network, comprising determining whether or not the controlled image processing apparatus supports an image deletion method designated in the job by a source image processing apparatus, determining whether or not the job can be executed without using a specific storage medium provided in the controlled image processing apparatus in a case that it is determined that the controlled image processing apparatus does not support the image deletion method designated by the source image processing apparatus, and performing control such that the job is executed without using the specific storage medium when it is determined that the job can be executed without using the specific storage medium.

In a fourth aspect of the present invention, there is provided a non-transitory computer-readable storage medium storing a program for causing a computer to execute a method of controlling an image processing apparatus which functions as a destination device in a case where a single job is cooperatively executed by a plurality of image processing apparatuses, including the controlled image processing apparatus, via a network, wherein the method comprises determining whether or not the controlled image processing apparatus supports an image deletion method designated in the job by a source image processing apparatus, determining whether or not the job can be executed without using a specific storage medium provided in the controlled image processing apparatus in a case that it is determined that the controlled image processing apparatus does not support the image deletion method designated by the source image processing apparatus, and performing control such that the job is executed without using the specific storage medium when it is determined that the job can be executed without using the specific storage medium.

According to the present invention, in a case where a plurality of image processing apparatuses execute a single job in a cooperative manner, it is possible for an image processing apparatus as a cooperation source (source device) and an image processing apparatus as a cooperation destination (destination device) to improve information security in their entirety. For example, even when a cooperation-destination image processing apparatus is not capable of performing image deletion according to an image deletion method designated by a cooperation-source image processing apparatus, it is possible to prevent an associated image from leaking out, to thereby maintain information security.

Further features of the present invention will become apparent from the following description of an exemplary embodiment (with reference to the attached drawings).

BRIEF DESCRIPTION OF THE DRAWINGS

FIG. 11 is a diagram showing the configuration of a job management table used in the FAX reception cooperative job and values set in a step in FIG. 5.

FIG. 12 is a diagram showing the contents of a JobStart command.

FIG. 13 is a diagram showing the contents of a JobStartAck command.

FIG. 16 is a diagram showing the contents of a JobCompleted event.

FIG. 17 is a diagram showing the configuration of a record of a job log used in the FAX reception cooperative job and values set in a step in FIG. 7.

FIG. 18 is a diagram showing the contents of a DeleteCompleted event.

FIGS. 22A and 22B are a flowchart of an image data deletion process executed in the FAX reception cooperative job by the cooperation-destination image processing apparatus.

FIG. 23 is a diagram showing the configuration of a job management table used in the FAX reception cooperative job and values set in a step in FIG. 20.

FIG. 24 is a diagram showing the configuration of a record of a job log used in the FAX reception cooperative job and values set in a step in FIG. 21.

FIG. 26 is a diagram of an example of an intermediate display of the job log in the FAX reception cooperative job.

FIG. 27 is a diagram of an example of a final display of the job log in the FAX reception cooperative job.

FIG. 30 is a diagram showing the configuration of a job management table in the FAX transmission cooperative job and values set in the step in FIG. 5.

FIG. 32 is a diagram showing the configuration of a record of a job log used in the FAX transmission cooperative job and values set in a step in FIG. 7.

FIG. 33 is a diagram showing the configuration of a job management table used in the FAX transmission cooperative job and values set in the step in FIG. 20.

FIG. 35 is a diagram showing the configuration of a record of a job log used in the FAX transmission cooperative job and values set in the step in FIG. 21.

FIG. 38 is a diagram of an example of an intermediate display of the job log in the FAX transmission cooperative job.

FIG. 39 is a diagram of an example of a final display of the job log in the FAX transmission cooperative job.

DETAILED DESCRIPTION OF THE EMBODIMENTS

The present invention will now be described in detail below with reference to the accompanying drawings showing embodiments thereof.

Figure 1:
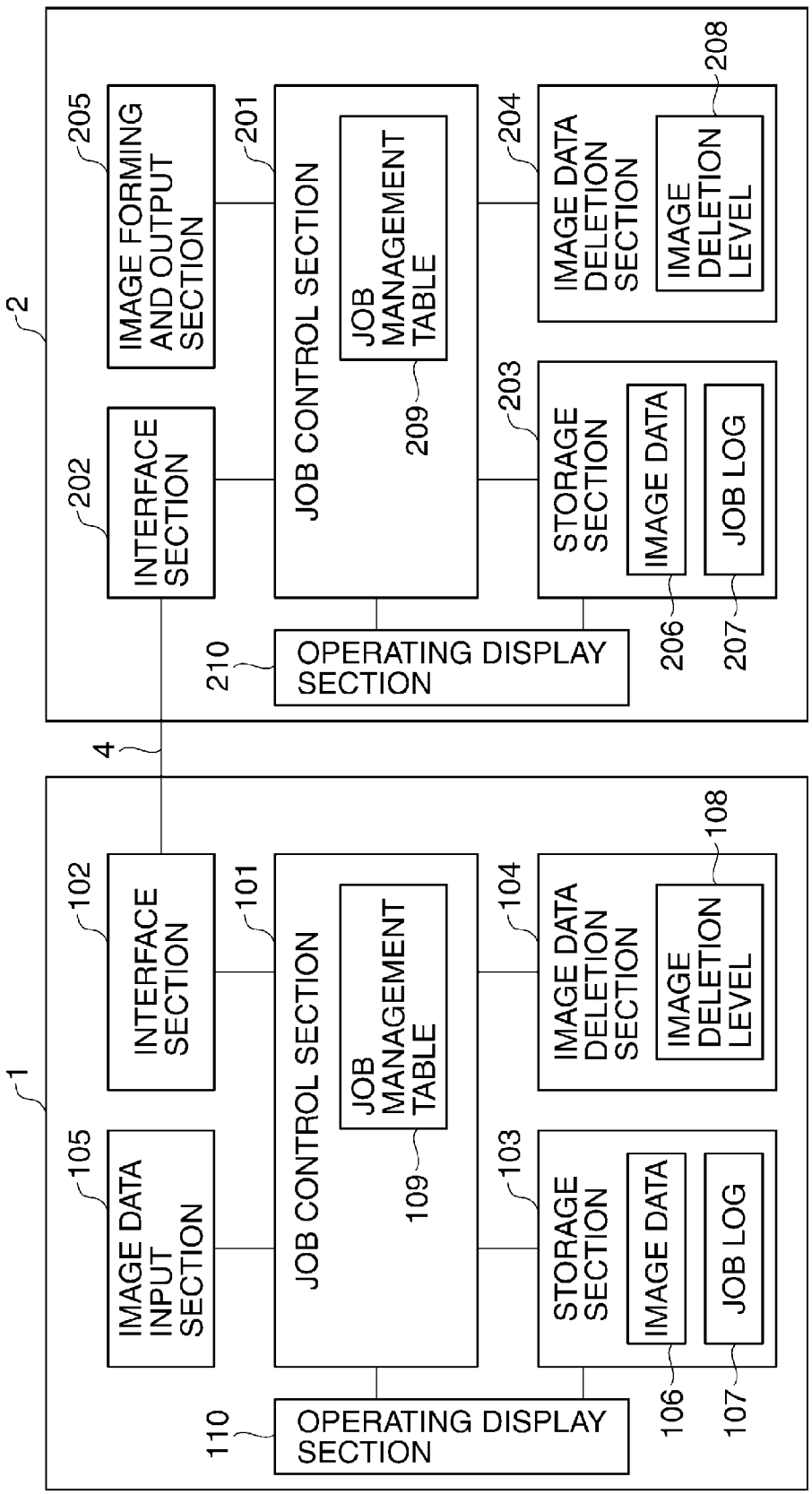
FIG. 1 is a functional block diagram of a cooperation-source image processing apparatus and a cooperation-destination image processing apparatus of an image processing system according to a first embodiment of the present invention.

FIG. 1 is a functional block diagram of an image processing system according to a first embodiment of the present invention, including an image processing apparatus as a cooperation source and an image processing apparatus as a cooperation destination. The cooperation-source image processing apparatus 1 and the cooperation-destination image processing apparatus 2 appearing in FIG. 1 are connected to a same network 4 to execute a single job in a cooperative manner. In short, the image processing apparatuses 1 and 2 function as component apparatuses forming the image processing system for executing cooperative jobs. In the present embodiment, the cooperation-source image processing apparatus 1 is implemented by a multifunction peripheral (MFP), while the cooperation-destination image processing apparatus 2 is implemented by a network printer. Therefore, the two apparatuses are slightly different in hardware configuration, as described hereinafter.

However, the two apparatuses have substantially the same functional blocks unique to the present embodiment as shown in FIG. 1. More specifically, the cooperation-source image processing apparatus 1 and the cooperation-destination image processing apparatus 2 are different from each other only in that the former has an image data input section 105, whereas the latter has an image forming and output section 205 in place of an image data input section.

Except for the image data input section 105 and the image forming and output section 205, the image processing apparatuses 1 and 2 have the same functional blocks, i.e. job control sections 101 and 201, storage sections 103 and 203, image data deletion sections 104 and 204, and operating display sections 110 and 210. The image processing apparatuses 1 and 2 are interconnected via respective interface sections 102 and 202 and the network 4.

The job control section 101 (201) of the image processing apparatus 1 (2) has a job management table 109 (209). The storage section 103 (203) of the image processing apparatus 1 (2) stores image data 106 (206) and a job log 107 (207). Further, an image deletion level 108 (208) is set in the image data deletion section 104 (204) of the image processing apparatus 1 (2).

The cooperation-source image processing apparatus 1 stores image data input by the image data input section 105 in the storage section 103, and sends the image data to the cooperation-destination image processing apparatus 2 via the interface section 102 and the network 4. The image processing apparatus 2 outputs the image data received from the image processing apparatus 1, from the image forming and output section 205 after storing the image data in the storage section 203 (more specifically, an HDD 2006, referred to hereinafter), or without storing the same in the storage section 203. This point "after storage" or "without storage" is a feature of the present embodiments, and therefore detailed description thereof will be given hereinafter.

A job in which a cooperation-source image processing apparatus and a cooperation-destination image processing apparatus input and output image data in a cooperative manner as mentioned above will be referred to as "a cooperative job".

Figure 2:
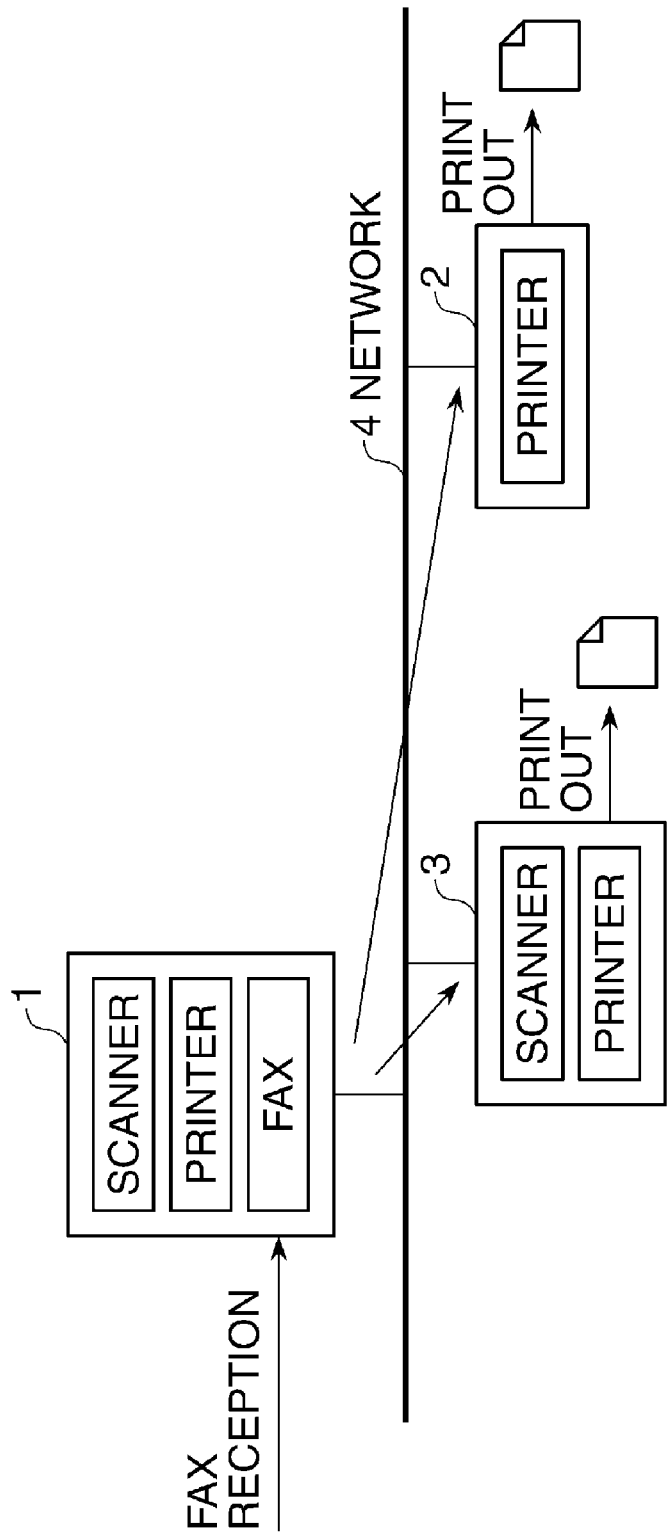
FIG. 2 is a diagram illustrating how a FAX reception cooperative job is executed.

FIG. 2 is a diagram illustrating an example of a FAX reception cooperative job in which FAX data received by the cooperation-source image processing apparatus 1 is sent to the cooperation-destination image processing apparatus 2 or a cooperation-destination image processing apparatus 3, and is printed out by the cooperation-destination image processing apparatus 2 or 3.

The image processing apparatuses 1 to 3 are connected to the same network 4 to cooperate with each other to execute the FAX reception cooperative job. The image processing apparatus 1 functions as a cooperation-source image processing apparatus, and is implemented by an MFP equipped with the scan function, the print function, and the facsimile function. Each of the image processing apparatuses 2 and 3 functions as a cooperation-destination image processing apparatus. The image processing apparatus 2 is configured as a network printer, and the image processing apparatus 3 is configured as a copying machine equipped with the scan function and the print function.

The FAX reception cooperative job is executed following a procedure in which FAX data received by the cooperation-source image processing apparatus 1 is sent to the cooperation-destination image processing apparatus 2 or 3 and is printed out by the same.

Figure 3:
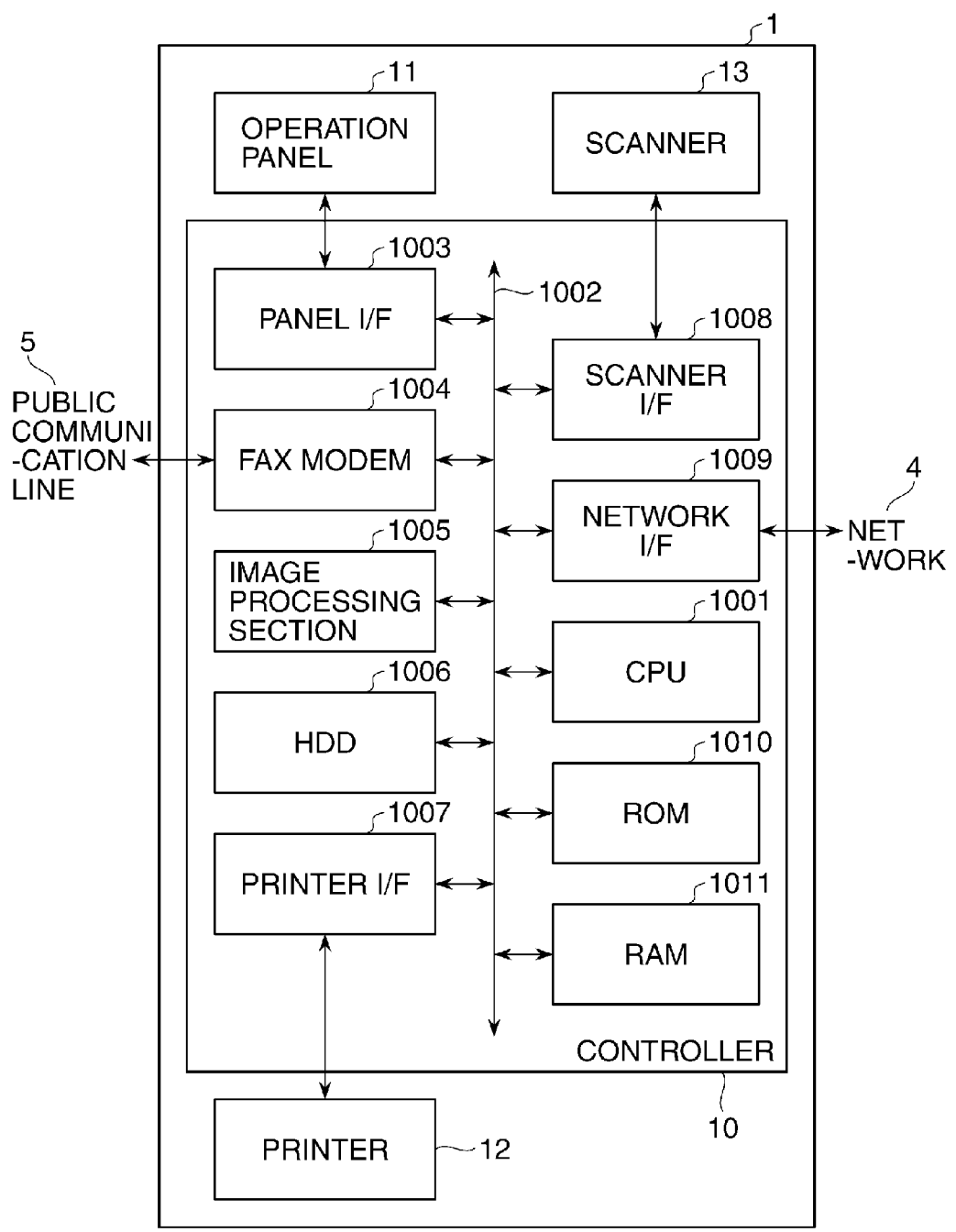
FIG. 3 is a block diagram of the hardware configuration of the cooperation-source image processing apparatus (MFP).

FIG. 3 is a block diagram of the hardware configuration of the image processing apparatus 1. The image processing apparatus 1 is implemented by an MFP as mentioned hereinabove, and has a controller 10 connected to a scanner 13, a printer 12, and an operation panel 11.

The controller 10 is comprised of a CPU 1001, a ROM 1010, a RAM 1011, a panel interface 1003, a FAX modem 1004, an image processing section 1005, an HDD 1006, a printer interface 1007, a scanner interface 1008, and a network interface 1009. These devices are interconnected by a bus 1002 such that data can be transferred therebetween.

The panel interface 1003 is connected to the operation panel 11 to transfer operation signals transmitted from the operation panel 11 to the CPU 1001 and output messages from the CPU 1001, soft buttons, etc. onto a touch panel (not shown) of the operation panel 11. The FAX modem 1004 exchanges FAX data with other facsimile machines connected to a public communication line 5.

The scanner interface 1008 is connected to the scanner 13 to supply image data read by the scanner 13 to the image processing section 1005. The printer interface 1007 is connected to the printer 12 to output image data having undergone image processing by the image processing section 1005 and stored in the HDD 1006 to the printer 12. The network interface 1009 transmits and receives data to and from external apparatuses connected to the network 4. The HDD 1006 stores image data input from the FAX modem 1004, the scanner interface 1008, and the network interface 1009 and having undergone image processing by the image processing section 1005. The HDD 1006 also stores job logs. The image processing section 1005 performs various kinds of image processing, such as compression/expansion, correction, and filtering, on image data under the control of the CPU 1001 before output or after input of the image data.

The CPU 1001 controls each of the devices of the controller 10 according to a control program stored in the ROM 1010. The ROM 1010 stores not only the control programs but also UI screen information to be displayed on the touch panel of the operation panel 11. The RAM 1011 provides a work area for the CPU 1001 and is used e.g. for temporarily storing image data.

Now, a description will be given of correspondences between the FIG. 1 functional block diagram of the image processing apparatus 1 and the FIG. 3 block diagram of the hardware configuration of the same. The job control section 101 and the image data deletion section 104 in FIG. 1 correspond to the CPU 1001, the ROM 1010, the RAM 1011, and the image processing section 1005 in FIG. 3. The interface section 102 in FIG. 1 corresponds to the network interface 1009 in FIG. 3. The storage section 103 in FIG. 1 corresponds to the HDD 1006 in FIG. 3. The image data input section 105 in FIG. 1 corresponds to the FAX modem 1004 in FIG. 3. The operating display section 110 in FIG. 1 corresponds to the operation panel 11, the panel interface 1003, the CPU 1001, the ROM 1010, and the RAM 1011.

Figure 4:
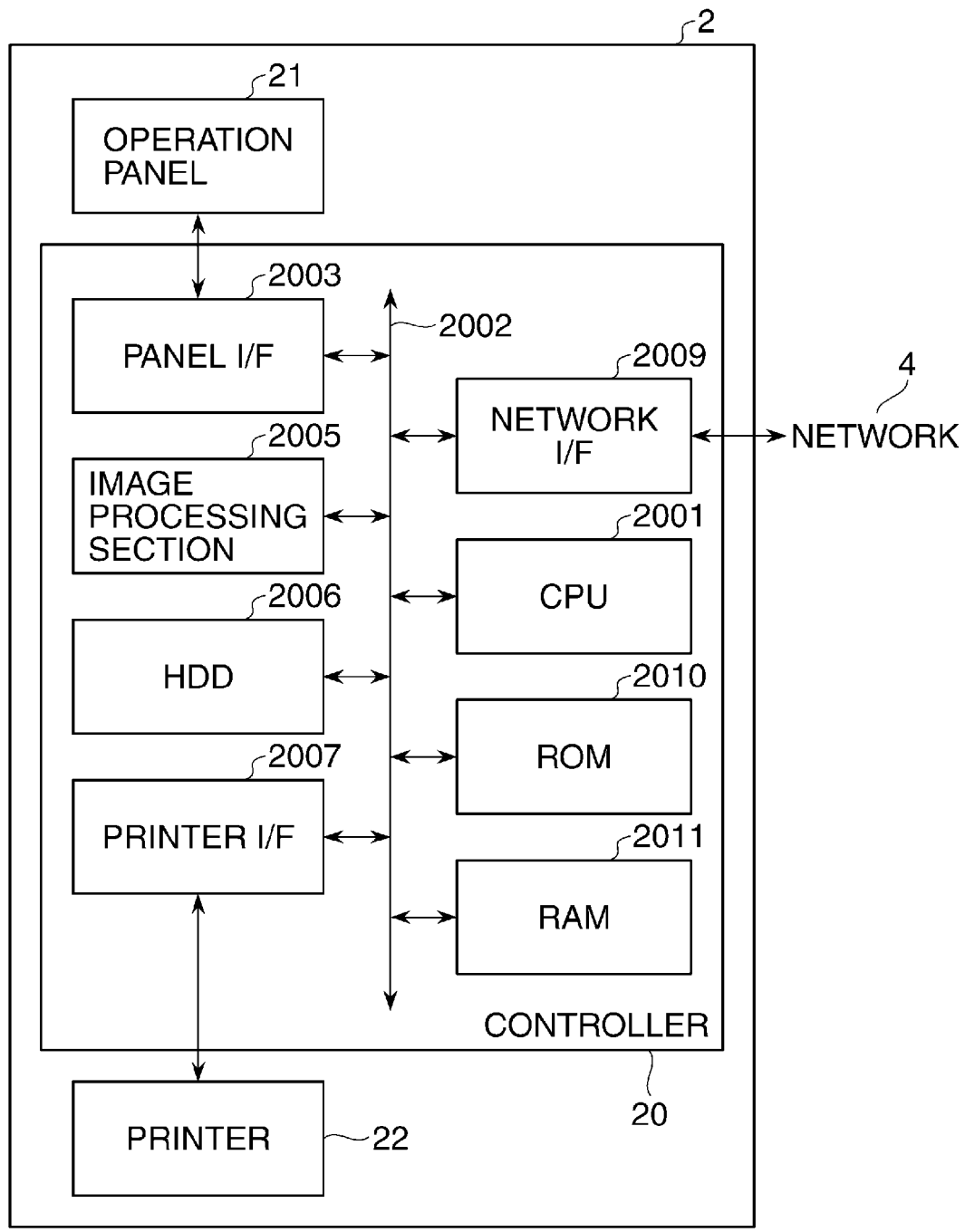
FIG. 4 is a block diagram of the hardware configuration of the cooperation-destination image processing apparatus (network printer).

FIG. 4 is a block diagram of the hardware configuration of the image processing apparatus 2. The image processing apparatus 2 functions as a network printer, and therefore it is different from the image processing apparatus 1 configured as an MFP in that the former does not include devices corresponding to the FAX modem 1004, the scanner 13, and the scanner interface 1008.

Now, a description will be given of correspondences between the FIG. 1 functional block diagram of the image processing apparatus 2 and the FIG. 4 block diagram of the hardware configuration of the same. The job control section 201 and the image data deletion section 204 in FIG. 1 correspond to a CPU 2001, a ROM 2010, a RAM 2011, and an image processing section 2005 in FIG. 4. The interface section 202 in FIG. 1 corresponds to a network interface 2009 in FIG. 4. The storage section 203 in FIG. 1 corresponds to an HDD 2006 in FIG. 4. The image forming and output section 205 in FIG. 1 corresponds to a printer interface 2007 in FIG. 4 and a printer 22. The operating display section 210 in FIG. 1 corresponds to an operation panel 21, a panel interface 2003, the CPU 2001, the ROM 2010, and the RAM 2011 in FIG. 4. The CPU 2001, the panel interface 2003, the image processing section 2005, the HDD 2006, the printer interface 2007, the network interface 2009, the ROM 2010, and the RAM 2011 form a controller 20.

Next, processing executed by the image processing apparatuses 1 and 2 for the FAX reception cooperative job will be described in detail. FIGS. 5 to 10 are flowcharts of respective processes executed by the cooperation-source image processing apparatus 1 for the FAX reception cooperative job.

Figure 5:
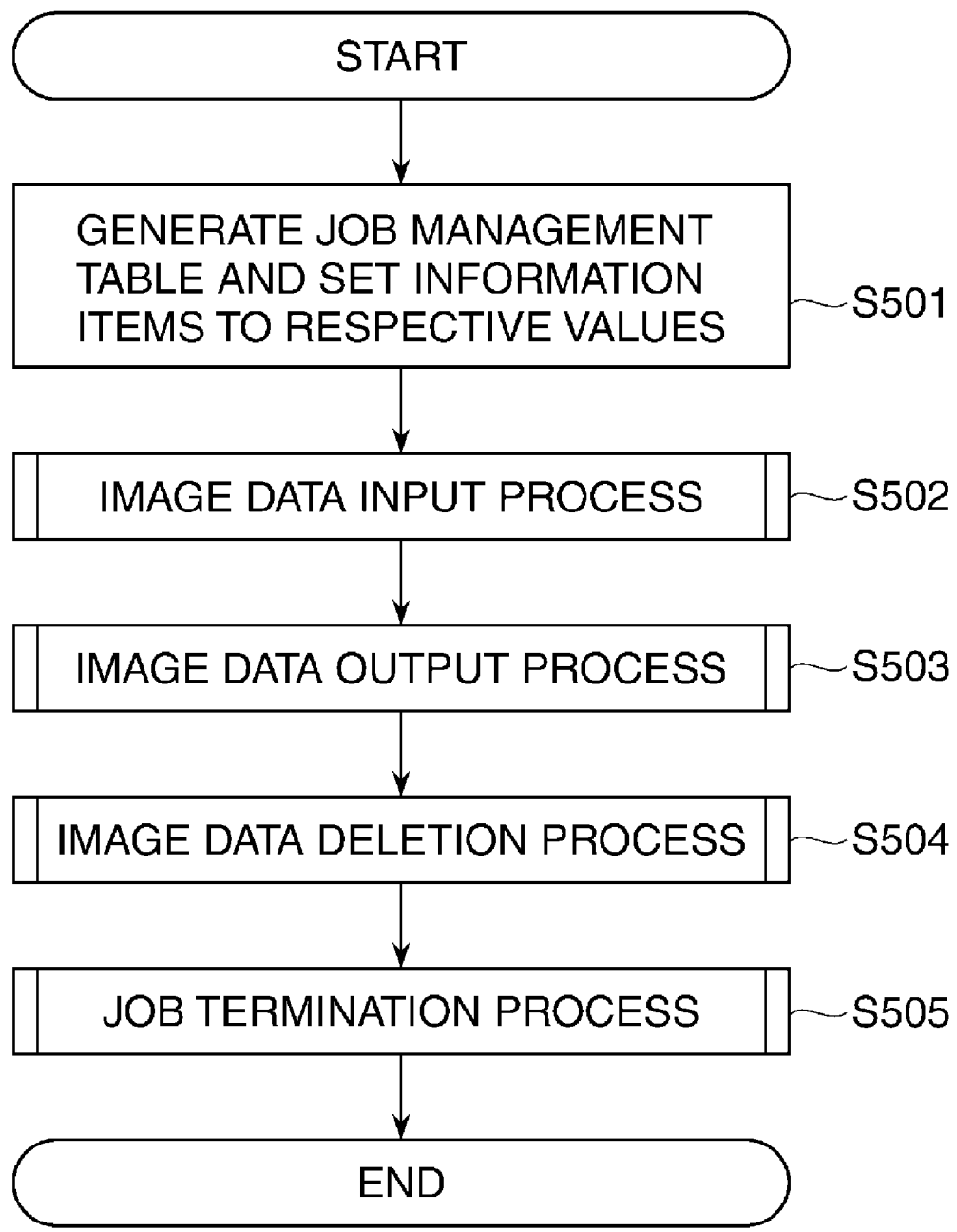
FIG. 5 is a flowchart showing the outline of a FAX reception cooperative process executed by the cooperation-source image processing apparatus for the FAX reception cooperative job.

FIG. 5 is a flowchart showing the outline of a FAX reception cooperative process executed by the cooperation-source image processing apparatus 1 for the FAX reception cooperative job.

When FAX data is input from the image data input section 105 (FAX modem 1004), the job control section 101 of the cooperation-source image processing apparatus 1 generates the job management table 109 and sets information items in the job management table 109 to respective values (S501). The information items in the job management table 109 and the values set in the step S501 are shown in FIG. 11.

An item "JobID" in FIG. 11 indicates the identifier of a job, and is set to an ID value assigned to the job by the job control section 101. An item "Job Type" indicates the type of a cooperative job, and is set to "FAX reception". An item "Job Reception Time" indicates the reception time of a cooperative job, and is set to time at which the step S501 in FIG. 5 is executed. An item "Job Processing Status" indicates the processing status of a cooperative job, and is set to "data input" at a time point corresponding to the step S501. An item "FAX Reception Information" indicates various kinds of information concerning FAX reception, and is set to information, such as the telephone number of a FAX sender. An item "Image Storage Information" indicates information concerning storage of image data in the storage section 103, and is set to information, such as an image storage destination address.

An item "Image Deletion Level" indicates the deletion level (0/1/2) of image data to be handled in the cooperative job. For example, "Image Deletion Level" is configured as "Level 0: only logical deletion", "Level 1: one-time overwriting with random data", and "Level 2: three-time overwriting with random data".

In this case, the degree of security of information is held as Level 0<Level 1<Level 2. This means that as the number of times of overwriting with random data is larger, the degree of unclearness of original data is higher, and therefore the actual effect of preventing information leakage is increased.

In the step S501, the value of an image deletion level set in the image processing apparatus 1 in advance is set in the job management table 109. An item "Image Deletion Check" indicates which of the cooperation source and the cooperation destination is to check image deletion related to the cooperative job, and one of the cooperation source and the cooperation destination is set e.g. according to the type of the cooperative job.

In the FAX reception cooperative job, it is more convenient to check image deletion in the cooperation-destination image processing apparatus that prints out FAX data than by the cooperation-source image processing apparatus that only transfers FAX data, and therefore the item "Image Deletion Check" is set to "cooperation destination".

An item "Image Deletion State at Self-Apparatus" indicates the deletion state (undeleted/deleted) of image data 106 stored in the storage section 103 of the image processing apparatus 1 (cooperation source). At this time point, "Image Deletion State at Self-Apparatus" is set to "undeleted". An item "Image Output Destination" indicates information for designating the output destination (cooperation destination) of image data, and is set to the IP address or the like of a cooperation-destination image processing apparatus, for example. At the present time point, however, since no cooperation destination has been designated yet, the item "Image Output Destination" is set to nothing.

An item "Image Transmission Mode" indicates an image transmission method (multi/single) for transmitting image data from a cooperation source to a cooperation destination. The value "multi" indicates a method of transmitting all pages of image data in a batch, and the value "single" indicates a method of transmitting image data on a page-by-page basis. In the first embodiment, the cooperation-source image processing apparatus 1 stores in the storage section 103 the image data 106 in an amount corresponding to a plurality of pages to be sent to the cooperation-destination image processing apparatus 2, and therefore, at the present time point, "multi" is set by default.

An item "Image Deletion Completion Notification from Cooperation Destination" indicates information indicative of whether or not a notification of image data deletion completion has been received from a cooperation source. At the present time point, however, since the image data 106 has not been transmitted yet, the item "Image Deletion Completion Notification from Cooperation Destination" is set to nothing. An item "Image Deletion State at Cooperation Destination" indicates the image data deletion state (undeleted/deleted) at a cooperation destination. At the present time point, however, since the image data 106 has not been transmitted yet, the item "Image Deletion State at Cooperation Destination" is set to nothing.

The job control section 101 sequentially executes an image data input process (S502) for inputting image data from the image data input section 105, an image data output process (S503) for outputting the image data to the image processing apparatus 2, an image data deletion process (S504), and a job termination process (S505) in the mentioned order.

Hereafter, the processes will be sequentially described in the mentioned order.

Figure 6:
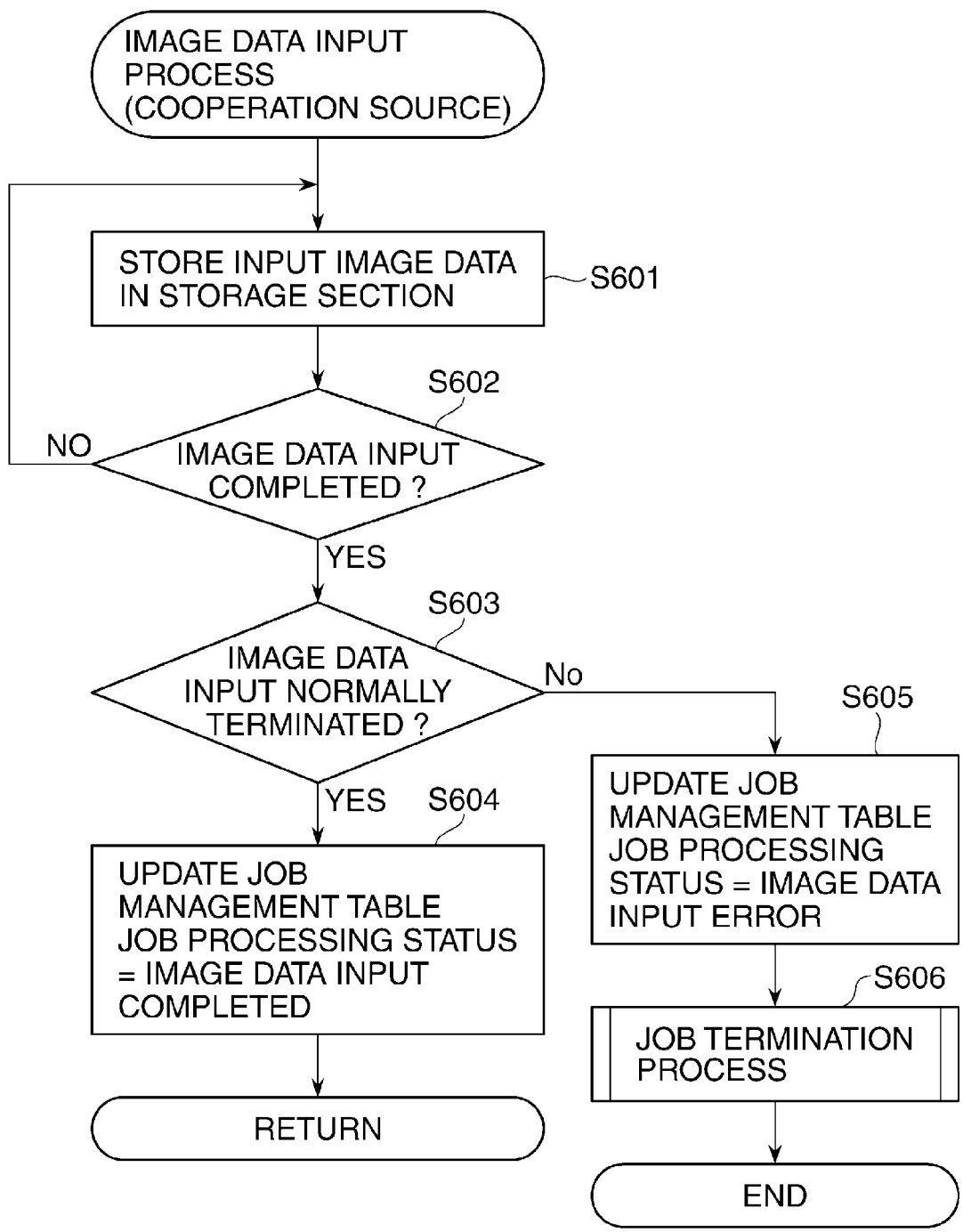
FIG. 6 is a flowchart of an image data input process executed in the FAX reception cooperative job by the cooperation-source image processing apparatus.

FIG. 6 is a flowchart of the image data input process executed by the cooperation source. The job control section 101 of the cooperation-source image processing apparatus 1 sequentially stores image data (pages) 106 input by the image data input section 105 (FAX modem 1004) in the storage section 103 (HDD 1006) (S601 to S602). Then, the job control section 101 determines whether or not the processing for inputting image data has been normally terminated (S603).

If the processing for inputting image data has been normally terminated, the job control section 101 updates "Job Processing Status" in the job management table 109 to "image data input completion" (S604), followed by terminating the image data input process. If the processing for inputting image data has not been normally terminated, the job control section 101 updates "Job Processing Status" in the job management table 109 to "image data input error" (S605) and then executes the job termination process (S606), followed by terminating the FAX reception cooperative job at the cooperation source.

Figure 7:
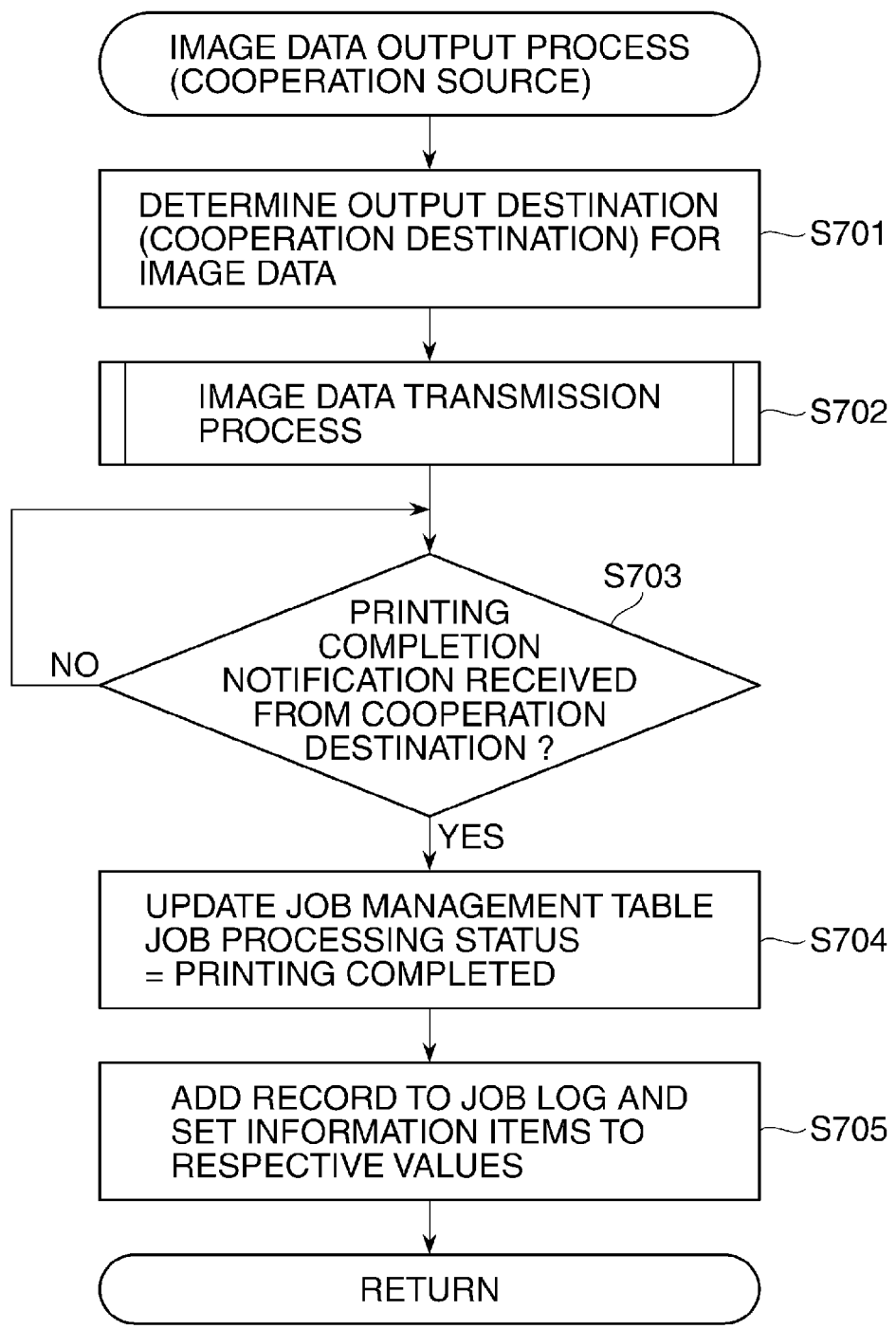
FIG. 7 is a flowchart of an image data output process executed in the FAX reception cooperative job by the cooperation-source image processing apparatus.

FIG. 7 is a flowchart of the image data output process executed by the cooperation source. The job control section 101 of the cooperation-source image processing apparatus 1 determines an image data output destination (cooperation destination) and sets "Image Output Destination" in the job management table 109 to the image data output destination (S701).

Although various methods can be employed to determine a cooperation destination, a method of determining a cooperation destination according to the telephone number of a FAX sender is employed in the present embodiment. For example, a correspondence table (not shown) associating the telephone numbers of FAX senders with respective cooperation sources is set in the cooperation-source image processing apparatus 1 in advance.

This enables the job control section 101 to search the correspondence table for the telephone number of the FAX sender set in the job management table 109 and then determine a cooperation destination. In this case, when a plurality of image processing apparatuses each equipped with the FAX function exist on the network 4, each of the image processing apparatuses can operate as a cooperation source. Therefore, it is preferred that each of the image processing apparatuses equipped with the FAX function has the correspondence table (not shown) set therein.

The job control section 101 sends the image data 106 stored in the storage section 103 in the step S601 to the cooperation destination (image processing apparatus 2) via the interface section 102 (S702).

Figure 14:
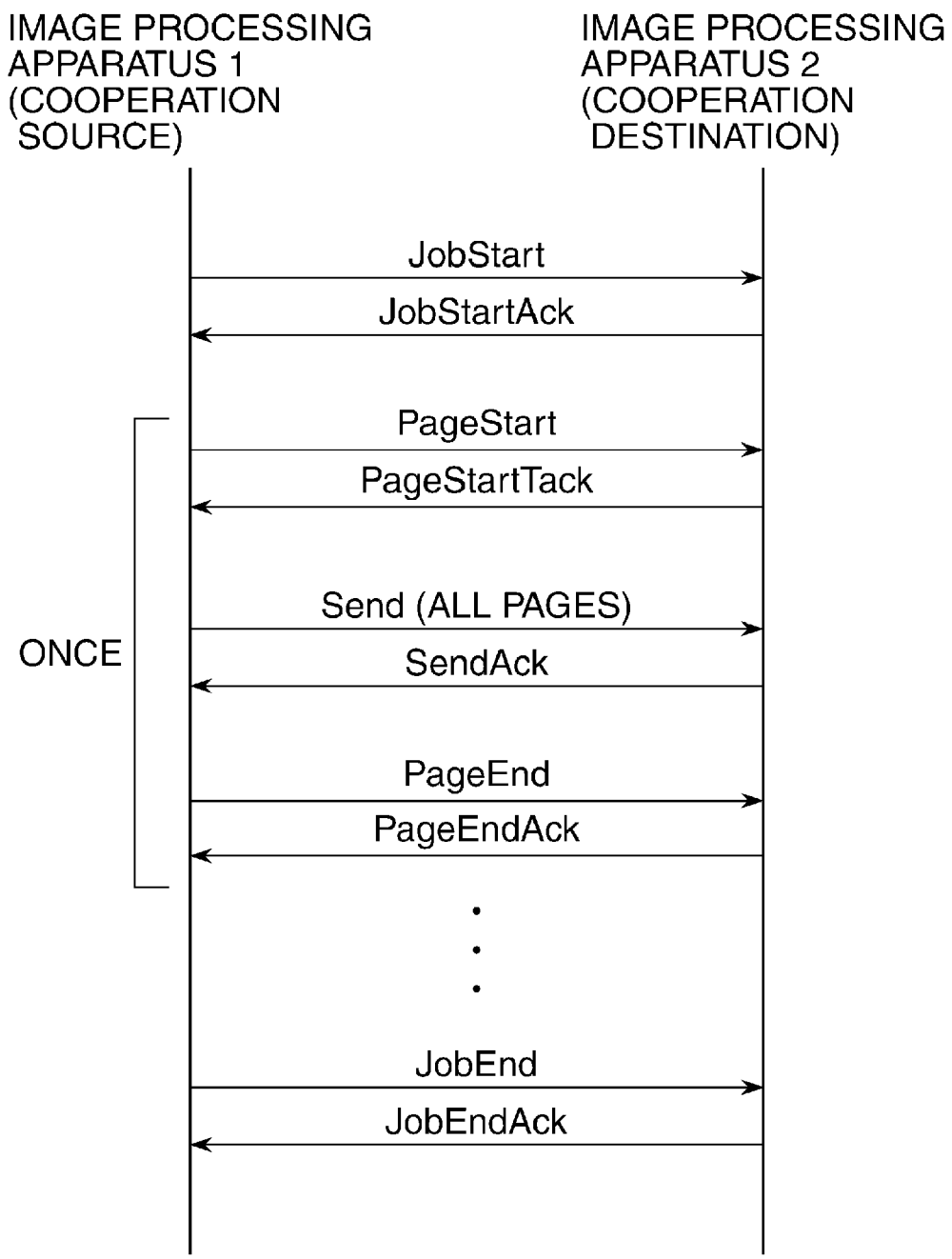
FIG. 14 is a sequence diagram of command exchange between the cooperation source and the cooperation destination in a case where Image Transmission Mode=multi.
Figure 15:
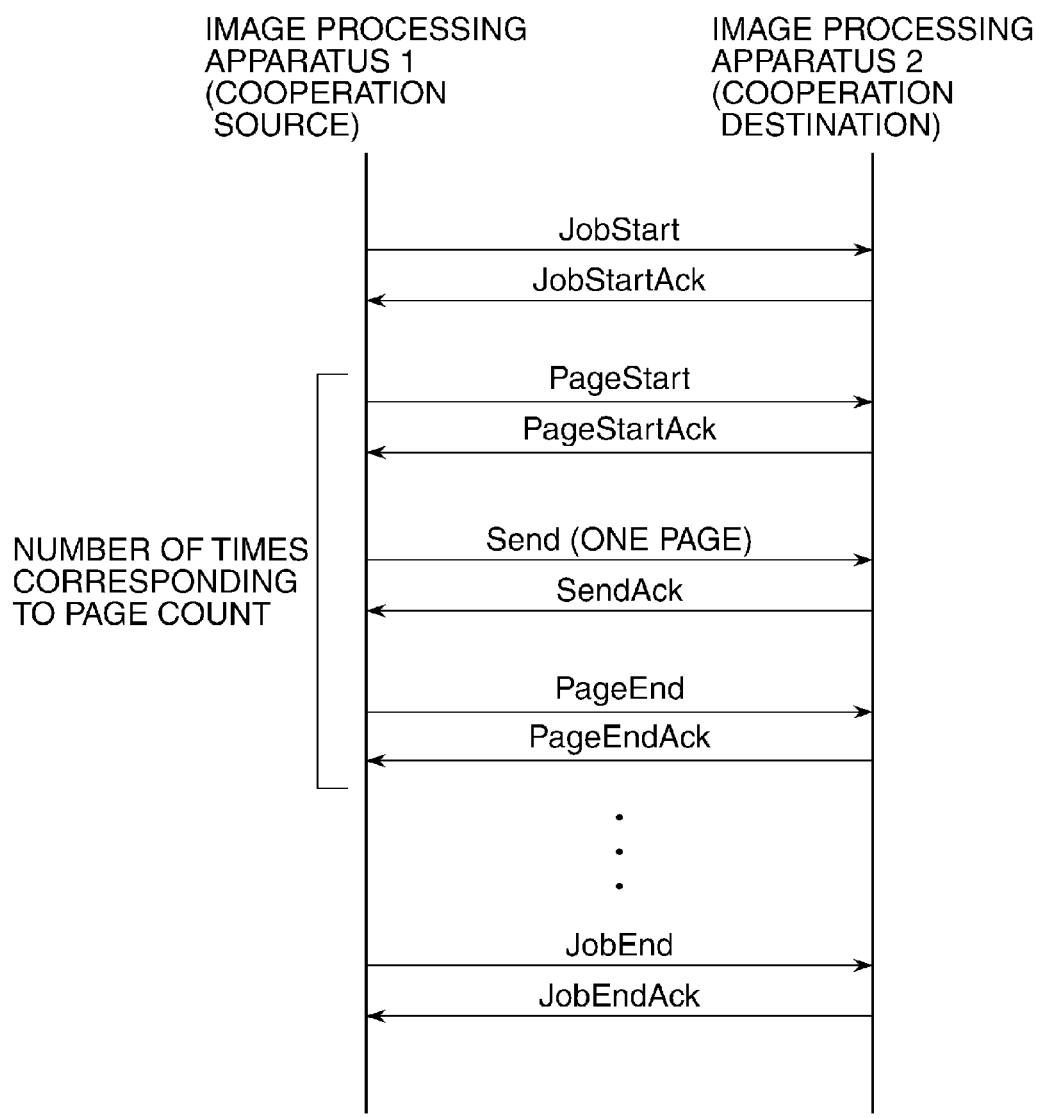
FIG. 15 is a sequence diagram of command exchange between the cooperation source and the cooperation destination in a case where Image Transmission Mode=single.

Now, an image data transmission process will be described in detail basically with reference to FIG. 8 before steps S703 et sec. are described. FIGS. 12, 13, and 16 to 18 show respective commands to be exchanged between the image processing apparatus 1 (cooperation source) and the image processing apparatus 2 (cooperation destination) in the image data transmission process. Further, each of FIGS. 14 and 15 shows a sequence of command exchange between the image processing apparatus 1 (cooperation source) and the image processing apparatus 2 (cooperation destination).

Figure 8:
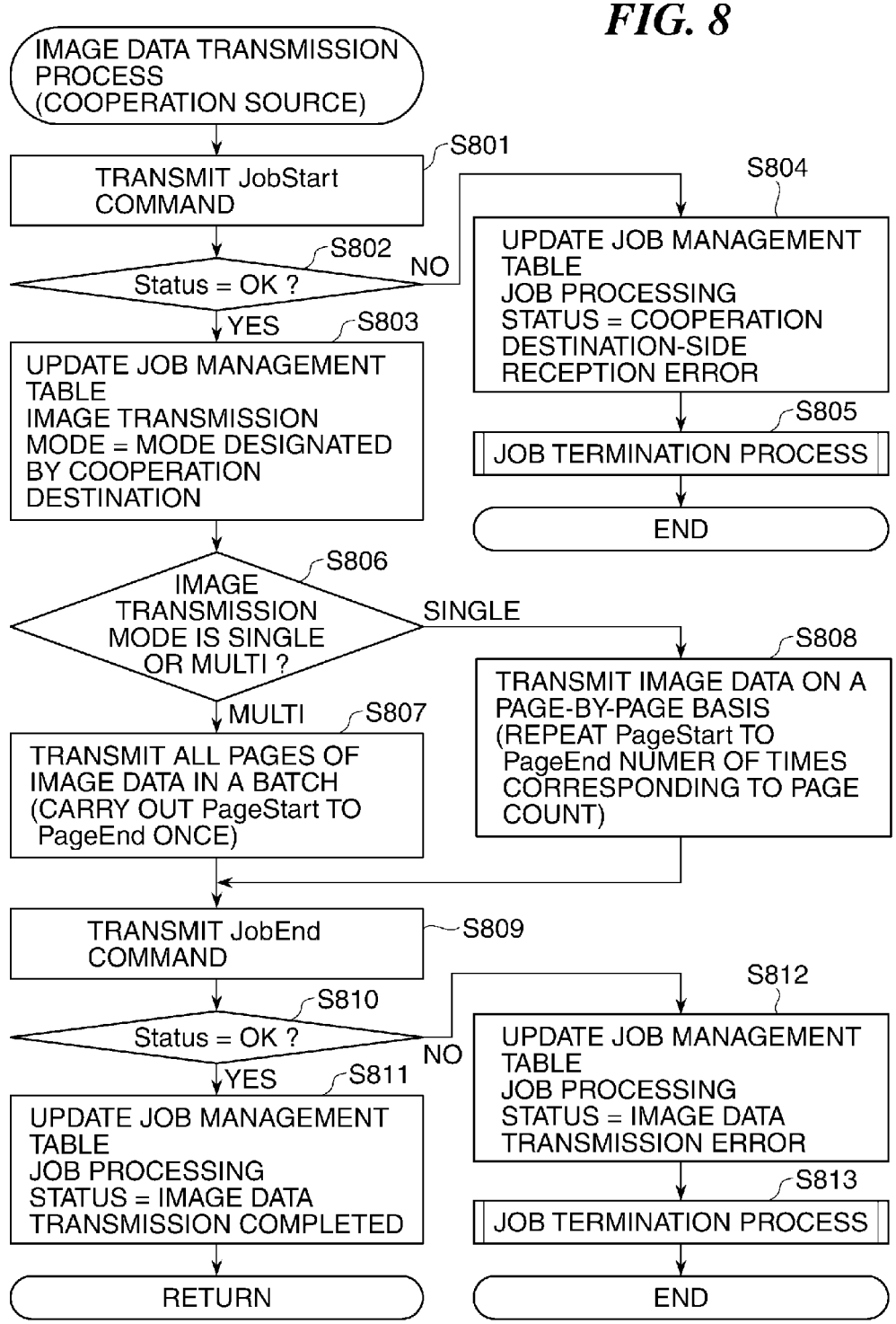
FIG. 8 is a flowchart of an image data transmission process executed in the FAX reception cooperative job by the cooperation-source image processing apparatus.

First, the job control section 101 of the image processing apparatus 1 (cooperation source) sends a "JobStart" command indicative of the start of a cooperative job to the image processing apparatus 2 (cooperation destination) (S801 in FIG. 8). The "JobStart" command is comprised of information items shown in FIG. 12, and each of the information items is set to a value of an associated one of the information items in the job management table 109.

As shown in FIG. 12, the "JobStart" command not only notifies a cooperation destination of the start of a cooperative job, but also contains instruction information on deletion of image data to be handled by the cooperative job ("image deletion level" and "image deletion check").

When a response "JobStartAck" command (see FIG. 13) as a response to the "JobStart" command is received from the image processing apparatus 2, the job control section 101 determines whether or not "Status" in the command is set to "OK" (S802). If "Status"="NG", the job control section 101 updates the item "Job Processing Status" in the job management table 109 to "cooperation destination-side reception error" (S804) and then executes the job termination process (S805), thereby terminating the FAX reception cooperative job by the cooperation source.

If "Status"="OK", the job control section 101 overwrites the value (multi/single) of "Image Transmission Mode" in the job management table 109 with the value of "Image Transmission Mode" in the command to thereby update the former (S803). This step is executed because in a case where the cooperation destination is not capable of operating in an "image transmission mode" designated by the cooperation source, the cooperation source is required to switch the value of "Image Transmission Mode" to the value (multi/single) of an "image transmission mode" in which the cooperation-destination image processing apparatus can operate.

The job control section 101 determines whether the item "Image Transmission Mode" in the job management table 109 is set to "multi" or "single" (S806). If "Image Transmission Mode"="Multi", the job control section 101 sends all pages of the image data 106 to the image processing apparatus 2 in a batch (S807).

FIG. 14 shows a command sequence executed in a case where "Image Transmission Mode"="multi". When "Image Transmission Mode"="multi", transmission of all pages of image data is performed in a single page sequence from a "PageStart" command indicative of the start of transmission to an "PageEndAck" command indicative of the termination of the transmission.

If "Image Transmission Mode"="single", the job control section 101 sends the image data 106 to the image processing apparatus 2 on a page-by-page basis (S808). When "Image Transmission Mode"="single", page-by-page image data transmission operations are sequentially performed in a plurality of page sequences from the "PageStart" command to the "PageEndAck" command as shown in FIG. 15. In other words, in this case, the page sequence from the "PageStart" command to the "PageEndAck" command is repeatedly executed the same number of times as a page count.

When the transmission of the image data 106 is terminated, the job control section 101 sends a "JobEnd" command indicative of the termination of the image data transmission to the image processing apparatus 2 (S809). When a "JobEndAck" command as a response to the "JobEnd" command is received from the image processing apparatus 2, the job control section 101 determines whether or not the item "Status" in the received command is set to "OK" (S810).

If "Status"="OK", the job control section 101 updates the item "Job Processing Status" in the job management table 109 to "image data transmission end" (S811), followed by terminating the image data transmission process.

On the other hand, if "Status"="NG", the job control section 101 updates the item "Job Processing Status" in the job management table 109 to "image data transmission error" (S812) and then executes the job termination process (S813), followed by terminating the FAX reception cooperative job by the cooperation source.

Returning to the description of the image data output process in FIG. 7, when the image data transmission process for transmitting the image data 106 to the image processing apparatus 2 is terminated, the job control section 101 awaits arrival of a printing completion notification ("JobCompleted" event) from the image processing apparatus 2 (S703). This printing completion notification ("JobCompleted" event) contains an item "Image Deletion Completion Notification (OFF/OFF)" as shown in FIG. 16.

When the printing completion notification is received from the image processing apparatus 2, the job control section 101 updates the job management table 109 (S704). In this case, the job control section 101 updates the item "Job Processing Status" in the job management table 109 to "printing end" and sets "Image Deletion Completion Notification from Cooperation destination" to a set value of the item "Image Deletion Completion Notification (OFF/ON)" in the "JobCompleted" event.

Then, the job control section 101 adds a new record to the job log 107 and records the values of information items in the job management table 109 or the like associated with respective information items of the job log 107 in the added record (S705), followed by terminating the image data output process. FIG. 17 shows the configuration of a record of the job log 107 and examples of the values set by the job control section 101 in the step S705.

An item "Record Number" is set to the record number of the added record. Items "JobID", "Job Type", "Job Reception Time", "Fax Reception Information", and "Image Output destination" are set to values of the respective associated information items in the job management table 109. Items "Job End Result" and "Print Sheet Count" are set to the respective values of "Status" and "Page Count" set in the printing completion notification sent from the image processing apparatus 2. An item "Job End Time" is set to current time.

An item "Image Deletion State at Self-Apparatus" indicates an image data deletion state (undeleted/deleted) in a cooperation-source apparatus itself (the image processing apparatus 1 in the present example). At this time point, the item "Image Deletion State at Self-Apparatus" is set to "undeleted". Items "Image Deletion Time at Self-Apparatus" and "Image Deletion Level" are set when "Image Deletion State" is set to "deleted". Therefore, at this time point, the items "Image Deletion Time at Self-Apparatus" and "Image Deletion Level" are set to nothing.

An item "Image Deletion State at Cooperation Destination" indicates an image data deletion state (undeleted/deleted) at a cooperation destination (the image processing apparatus 2 in the present example). At this time point, the item "Image Deletion State at Cooperation destination" is set to "undeleted". An item "Image Deletion Time at Cooperation Destination" is set when "Image Deletion State" is set to "deleted". Therefore, at this time point, the item "Image Deletion Time at Cooperation Destination" is set to nothing.

Figure 9A:
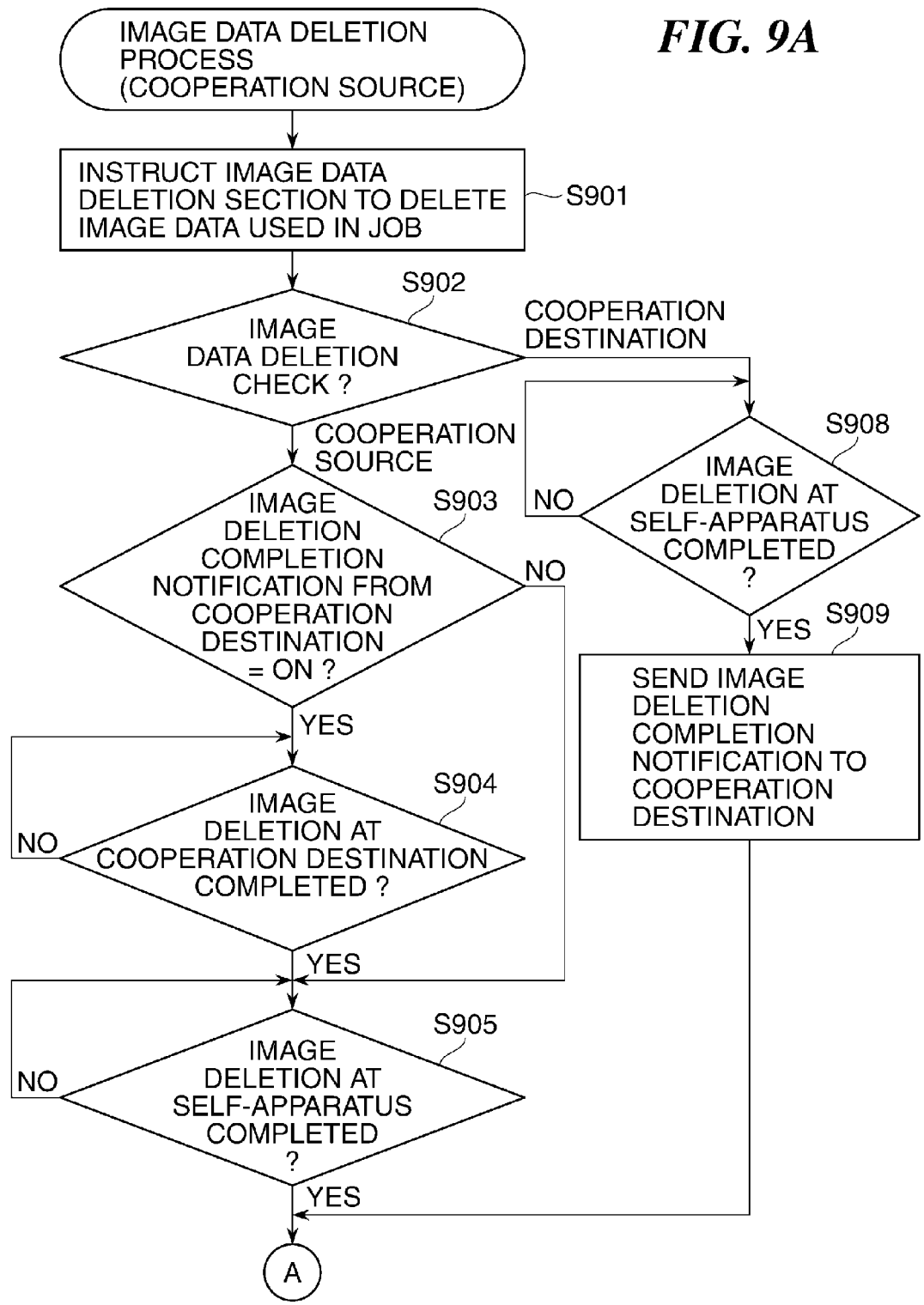
FIGS. 9A and 9B are a flowchart of an image data deletion process executed in the FAX reception cooperative job by the cooperation-source image processing apparatus.
Figure 9B:
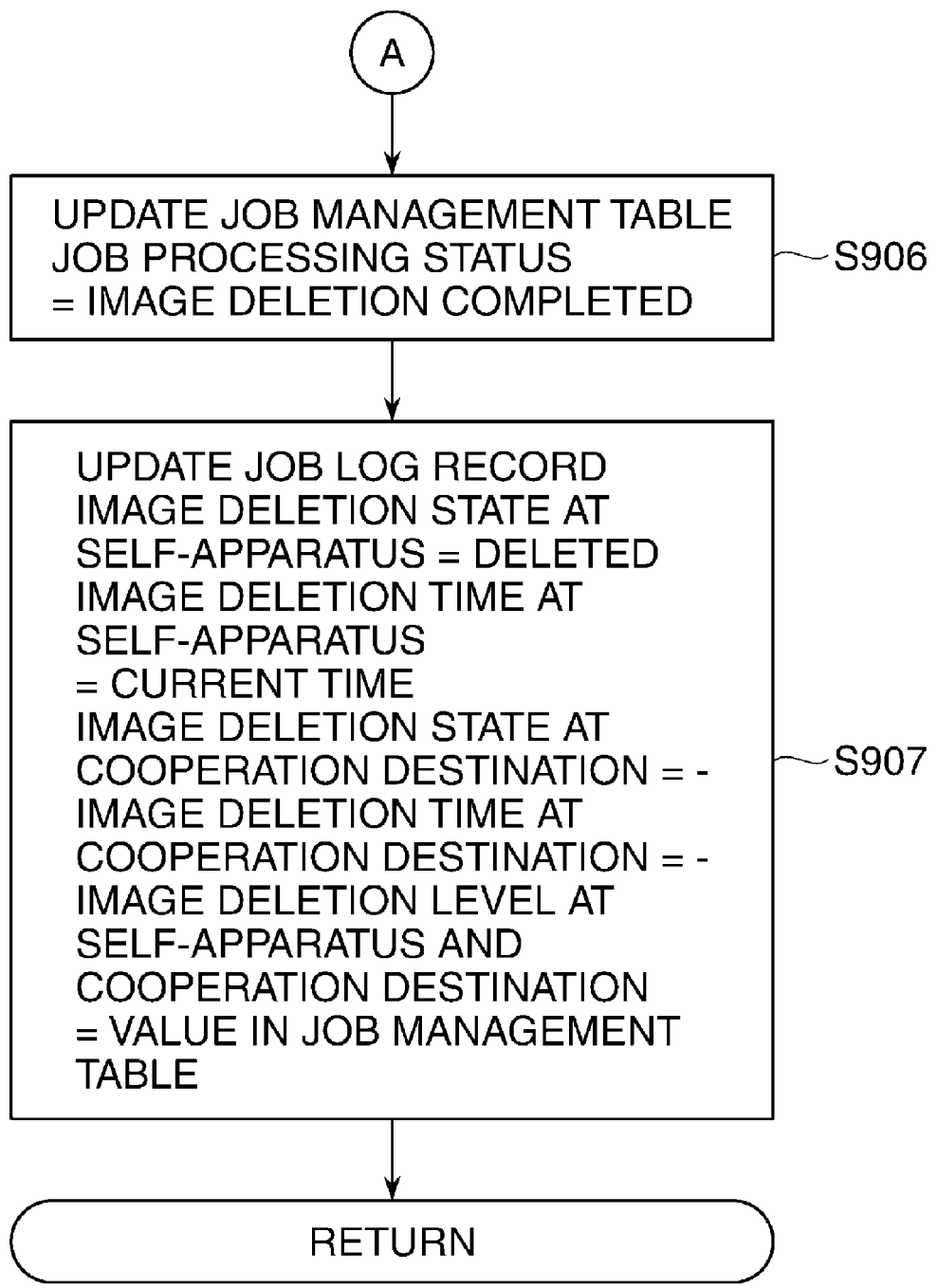

FIGS. 9A and 9B are a flowchart of the image data deletion process executed by the cooperation source. The job control section 101 of the cooperation-source image processing apparatus 1 instructs the image data deletion section 104 to delete the image data used in the FAX reception cooperative job (S901).

At this time, the job control section 101 designates, as an image data deletion method, the value (0/1/2) set as "Image Deletion Level" in the job management table 109. The image data deletion section 104 deletes the image data used in the present job, by the deletion method according to "Image Deletion Level" designated by the job control section 101. The image data deletion process by the image data deletion section 104 is executed in parallel with processing by the job control section 101.

The job control section 101 refers to the item "Image Deletion Check (cooperation source/cooperation destination)" in the job management table 109 (S902). If the item "Image Deletion Check" is set to "cooperation source", the process proceeds to a step S903, whereas if the item "Image Deletion Check" is set to "cooperation destination", the process proceeds to a step S908.

If "Image Deletion Check"="cooperation source", the job control section 101 refers to the item "Image Deletion Completion Notification from Cooperation Destination (OFF/ON)" in the job management table 109 in the step S903.

If "Image Deletion Completion Notification from Cooperation destination"="ON", the job control section 101 awaits both arrival of "Image Deletion Completion Notification" from the cooperation destination (image processing apparatus 2) (S904) and completion of image deletion at the self-apparatus (image data deletion section 104) (S905). On the other hand, if "Image Deletion Completion Notification from Cooperation Destination"="OFF", the job control section 101 awaits only completion of image deletion at the self-apparatus (image data deletion section 104) (S905).

If it is determined in the step S902 that "Image Deletion Check"="cooperation destination", the job control section 101 awaits completion of image deletion at the self-apparatus (image data deletion section 104) (S908). Then, when image deletion is completed, the job control section 101 sends an image deletion completion notification to the cooperation-destination image processing apparatus 2 (S909). This image deletion completion notification ("DeleteCompleted" event) contains an Item "Image Deletion Level (0/1/2)" as shown in FIG. 18.

It should be noted that when "Image Deletion Check"="cooperation destination", the image deletion completion notification (OFF/ON), i.e. the FIG. 16 printing completion notification ("JobCompleted" event) containing the image deletion completion notification (OFF/ON) is by no means sent from the cooperation destination, as described hereinafter.

Therefore, differently from a case where "Image Deletion Check"="cooperation source", when "Image Deletion Check"="cooperation destination", the job control section 101 does not refer to the item "Image Deletion Completion Notification from Cooperation destination (OFF/ON)" in the job management table 109. In the present example, since the job control section 101 determines that "Image Deletion Check"="cooperation destination", the process proceeds from the step S902 to the step S908.

When image deletion at the self-apparatus or the cooperation destination (image processing apparatus 2) is completed, i.e. when processing in the step S905 or S909 is completed, the job control section 101 updates the item "Job Processing Status" in the job management table 109 to "image deletion completed" (S906).

Then, the job control section 101 terminates the image data deletion process after updating the record of the job log 107 on the present job as follows (step S907): The job control section 101 sets "Image Deletion State at Self-Apparatus" to "deleted", "Image Deletion Time at Self-Apparatus" to "current time", "Image Deletion State at Cooperation Destination" to "–", "Image Deletion Time at Cooperation Destination" to "–", and "Image Deletion Level" to a value of "Image Deletion Level" set in the job management table 109.

Figure 10:
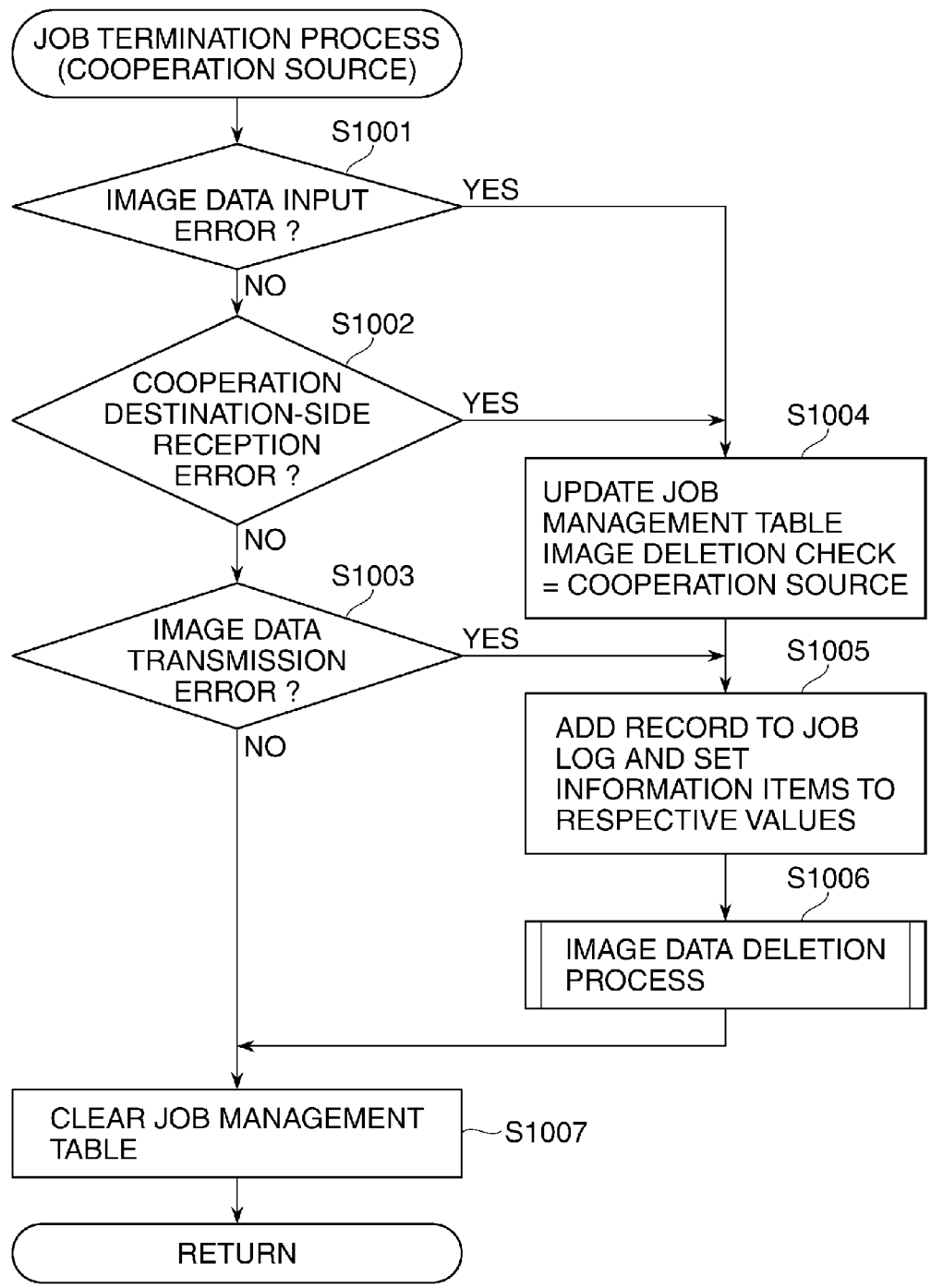
FIG. 10 is a flowchart of a job termination process executed in the FAX reception cooperative job by the cooperation-source image processing apparatus.

FIG. 10 is a flowchart of the job termination process executed by the cooperation source. The job termination process is executed in the following cases:

Case 1: where processing up to the image data deletion process has been normally executed (step S505 in FIG. 5)

Case 2: where the image data input process ends in image data input error (step S606 in FIG. 6)

Case 3: where the image data transmission process ends in cooperation destination-side reception error (step S805 in FIG. 8)

Case 4: the image data transmission process ends in image data transmission error (step S813 in FIG. 8)

First, the job control section 101 refers to the item "Job Processing Status" in the job management table 109 and determines which of the above-mentioned cases the item "Job Processing Status" corresponds to (S1001 to S1003). If "Job Processing Status" corresponds to Case 1, the job control section 101 clears the job management table 109 (S1007), followed by terminating the job termination process.

When the item "Job Processing Status" corresponds to Case 2 or Case 3, the cooperative job is terminated before the image data 106 is sent to the cooperation destination, and hence it is preferable that image data deletion check is performed at the cooperation source irrespective of the initial settings (step S501 in FIG. 5). In this case, therefore, the job control section 101 updates the item "Image Deletion Check" in the job management table 109 to "cooperation source" (S1004), and the process proceeds to steps S1005 and S1006.

If the item "Job Processing Status" corresponds to Case 4, the image data 106 has already been sent to the cooperation destination, and therefore the item "Image Deletion Check" in the job management table 109 is not updated.

The job control section 101 adds a new record to the job log 107 after execution of the step S1004 or S1003, to thereby record results of the cooperative job (S1005). In Case 2 or 3, the image data deletion process has not been executed yet at this time point, and therefore the job control section 101 executes the image data deletion process (S1006).

When the image data deletion process is terminated, the job control section 101 clears the job management table 109 (S1007), followed by terminating the job termination process.

FIGS. 19 to 22B are flowcharts of processes executed by the cooperation-destination image processing apparatus 2 for the FAX reception cooperative job. In the following, the processes executed by the cooperation destination will be described using the flowcharts.

Figure 19:
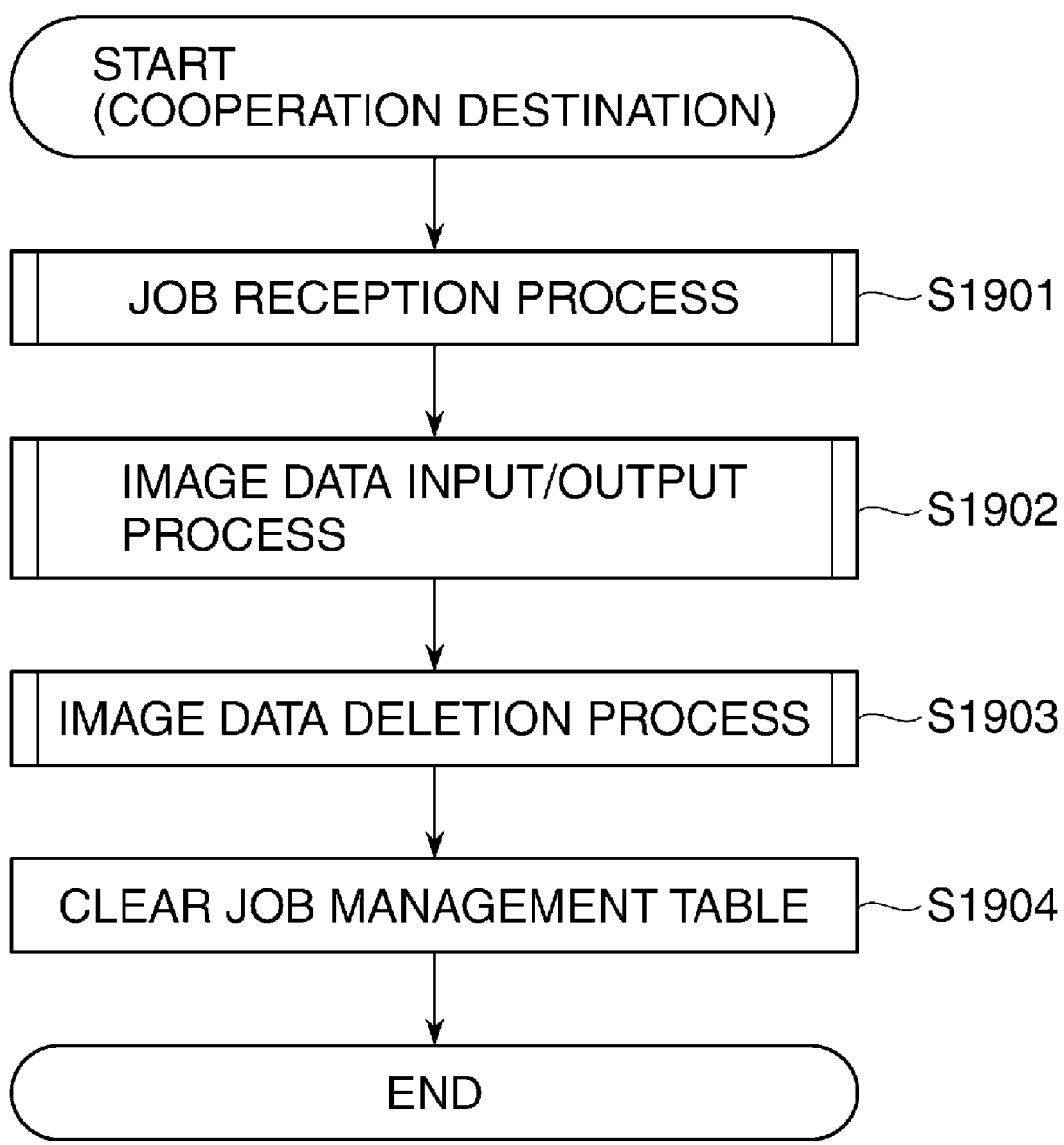
FIG. 19 is a flowchart showing the outline of a FAX reception cooperative process executed by the cooperation-destination image processing apparatus for the FAX reception cooperative job.

FIG. 19 is a flowchart of a FAX reception cooperative process executed by the cooperation-destination image processing apparatus 2 for the FAX reception cooperative job.

The present FAX reception cooperative process is started by a "JobStart" command indicative of the start of the cooperative job being input from the cooperation-source image processing apparatus 1 via the interface section 202, and is executed by the job control section 201 of the cooperation-destination image processing apparatus 2.

The job control section 201 sequentially executes a job reception process (S1901), an image data input/output process (S1902), and an image data deletion process (S1903), and finally clears the job management table 209 (S1904), followed by terminating the FAX reception cooperative job at the cooperation destination.

Hereafter, the above-mentioned processes will be described in the mentioned order.

Figure 20:
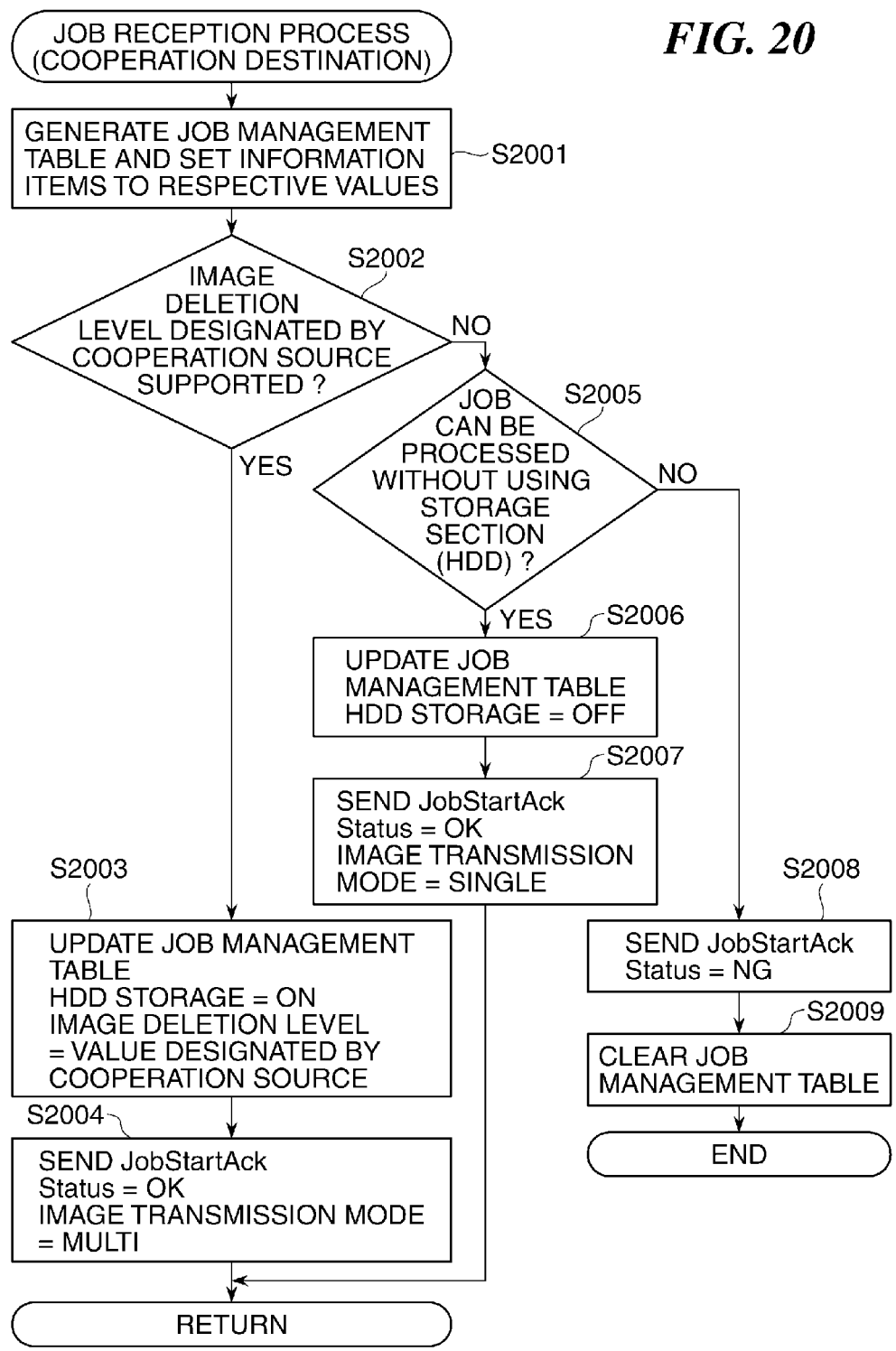
FIG. 20 is a flowchart of a job reception process executed in the FAX reception cooperative job by the cooperation-destination image processing apparatus.

FIG. 20 is a flowchart of the job reception process executed by the cooperation destination. First, the job control section 201 generates the job management table 209 and sets the information items of the job management table 209 to respective values based on the "JobStart" command received from the cooperation source (image processing apparatus 1) (S2001).

FIG. 23 shows the configuration of the job management table 209 and values set in the step S2001. First, a description will be given of the information items of the job management table 209. Items "JobID" to "Image Deletion State at Self-Apparatus" are the same as those of the job management table 109 of the cooperation source (image processing apparatus 1), and therefore description thereof is omitted.

An item "Image Input Source" indicates an image data input source (cooperation source). An item "HDD Storage" indicates whether or not to store image data received from the cooperation source in the storage section 203 (HDD 2006).

An item "Image Deletion State at Cooperation Source" indicates image data deletion state (undeleted/deleted) at the cooperation source.

Next, a description will be given of the values set in the step S2001. The items "JobID", "Job Type", "FAX Reception Information", "Image Deletion Check", and "Image Input Source" are set to respective associated values designated in the "JobStart" command. An item "Job Reception Time" is set to current time. An item "Job Processing Status" is set to "job being received".

An item "Image Storage Information" is set to an address or the like of a storage destination where the image data 206 received from the image processing apparatus 1 is to be stored. An item "Image Deletion Level" is set to the value of the image deletion level 208 set in advance in the image processing apparatus 1. The items "Image Deletion State at Self-Apparatus", "HDD Storage", and "Image Deletion state at Cooperation source" are not yet determined, and hence they are set to nothing.

The job control section 201 of the image processing apparatus 2 determines whether or not the image processing apparatus 2 as the cooperation destination supports an image deletion level designated in the "JobStart" command received from the cooperation source (image processing apparatus 1) (S2002). This step provide an example of a first determining unit of the present invention.

If the image deletion level designated by the cooperation source is supported, the job control section 201 updates the job management table 209 as follows (S2003): The item "HDD Storage" is set to "ON", and the item "Image Deletion Level" is updated to the image deletion level designated in the "JobStart" command received from the cooperation source. This enables the cooperation source and the cooperation destination to perform cooperative operation with the image deletion level (deletion method) in the cooperative job adjusted to substantially the same level.

Then, the job control section 201 sends the "JobStartAck" command to the cooperation-source image processing apparatus 1 to thereby notify the same that job reception is possible (S2004).

On the other hand, if the image deletion level designated by the cooperation source is not supported, the job control section 201 determines whether or not the cooperative job can be executed not by using the storage section 203 (HDD 2006), but by using the RAM 2011 alone (S2005).

The routine of a program for executing the determination processing in the step S2005, the storage medium therefor, and the CPU 2001 as execution means therefor are an example of a second determining unit of the present invention.

The determination processing in the step S2005 is executed for the reason that even if the designated image deletion level is not supported, insofar as image data is not stored in the HDD 2006, processing for deleting image data stored in the HDD 2006 can be dispensed with.

In other words, even if the designated image deletion level is not supported, it is possible to maintain information security at a highest level insofar as image data is not stored in the HDD 2006 as a nonvolatile storage medium which is incapable of sufficiently ensuring information security.

In this case, even if deletion processing is not actually executed by the cooperation destination, the intention (purpose) of the deletion instruction related to the cooperative job is fulfilled in a substantially most favorable manner, and therefore integrity of the cooperative job (executability of cooperative processing) can be fully maintained.

If it is possible to execute the cooperative job without using the HDD 2006, the job control section 201 sets the item "HDD Storage" in the job management table 209 to "OFF" (S2006).

As a method that enables execution of the cooperative job without using the HDD 2006, a method can be considered in which the transmission mode for sending image data from the cooperation-source image processing apparatus 1 to the cooperation-destination image processing apparatus 2 is changed from "multi" to "single", and image data received by the image processing apparatus 2 is temporarily stored in the volatile RAM 2011.

The method using the volatile RAM 2011 makes it possible to process approximately 100% of the cooperative job without using the HDD 2006. In the event that the RAM 2011 cannot be used due to memory capacity shortage, it is possible to cope with the problem with ease by additionally providing an inexpensive volatile RAM.

After having set the item "HDD Storage" in the job management table 209 to "OFF", the job control section 201 sends the "JobStartAck" command to the cooperation-source image processing apparatus 1 to notify the same that job reception is possible (S2007). In this case, the job control section 201 sets the item "Image Transmission Mode" in the "JobStartAck" command to "single".

If the cooperative job cannot be processed without using the HDD 2006, the job control section 201 sends the "JobStartAck" command with Status=NG to the cooperation-source image processing apparatus 1 (S2008) to thereby notify the same that job reception is impossible. In this case, the job control section 201 clears the job management table 209 (S2009), and the FAX reception cooperative process by the cooperation destination is terminated.

When execution of the cooperative job is refused as above, the executability of cooperative processing of the cooperative job itself cannot be maintained, but it is possible to maintain information security at the highest possible level. It should be noted that an application program for executing the job reception process shown in FIG. 20, a storage medium storing the application program, and the CPU 2001 as means for executing the application program provide an example of a control unit of the present invention.

Figure 21:
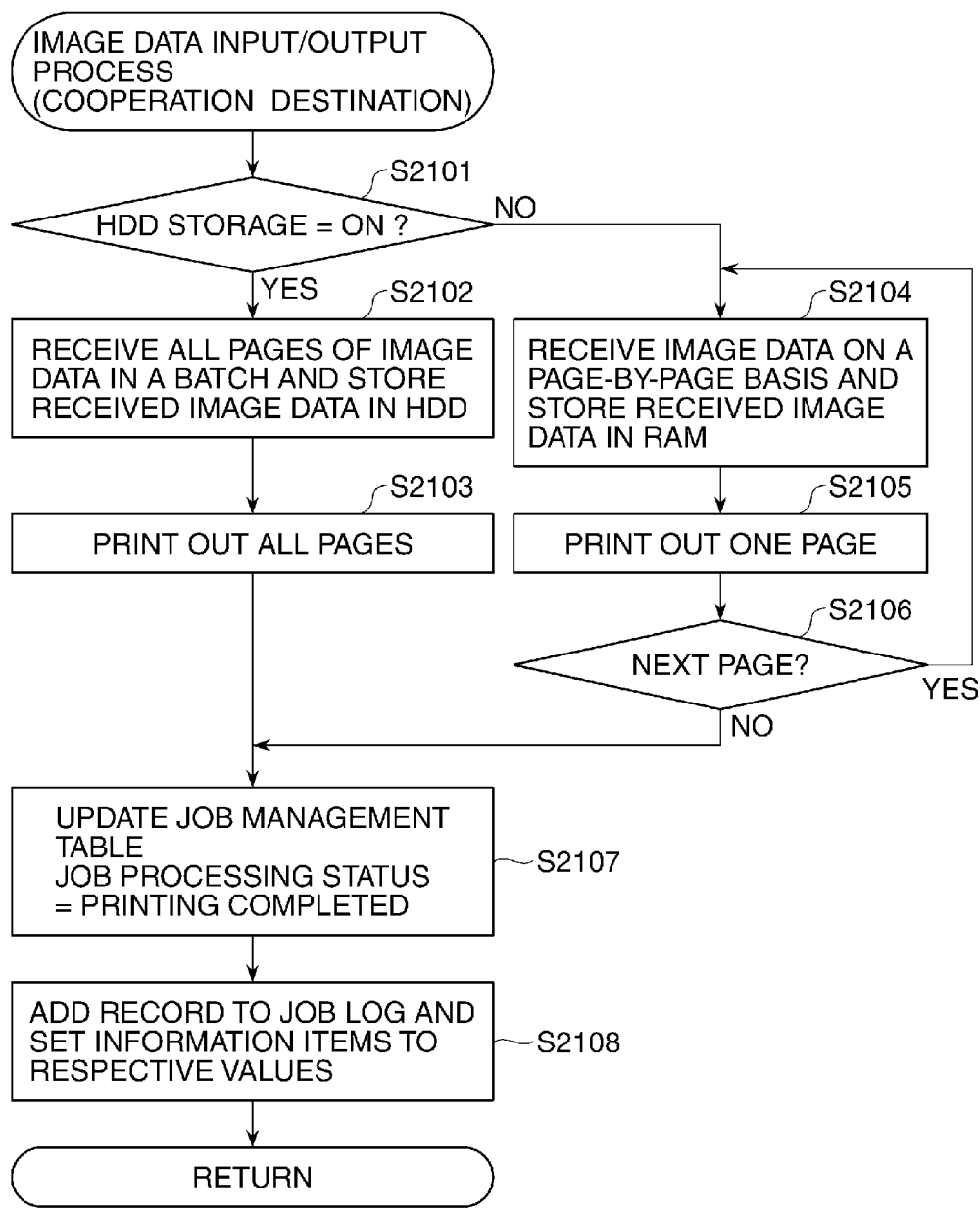
FIG. 21 is a flowchart of an image data input/output process executed in the FAX reception cooperative job by the cooperation-destination image processing apparatus.

FIG. 21 is a flowchart of the image data input/output process executed by the cooperation destination. The job control section 201 refers to the item "HDD Storage" in the job management table 209 and determines whether or not the HDD 2006 is to be used to process the present cooperative job (S2101).

If "HDD Storage"="ON", i.e. if the cooperative job is to be processed using the HDD 2006, the job control section 201 receives all pages of image data from the image processing apparatus 1 in a batch (S2102: the sequence in FIG. 14). Then, the job control section 201 stores the received image data in the HDD 2006 (S2102).

Then, the job control section 201 outputs the image data stored in the HDD 2006 to the image forming and output section 205 (printer 22) to print out all the pages (S2103).

On the other hand, if "HDD Storage"="OFF", i.e. if the cooperative job is to be processed without using the HDD 2006, the job control section 201 receives image data on a page-by-page basis (S2104: the sequence in FIG. 15). The job control section 201 temporarily stores the received image data of one page in the RAM 2011 (S2104).

Then, the job control section 201 outputs the image data stored in the RAM 2011 to the image forming and output section 205 (printer 22) to print out the one-page image data (S2105). The job control section 201 repeatedly carries out the steps S2104 and S2105 and a step S2106 a number of times corresponding to the number of pages of the image data to thereby print out all the pages.

When printing of all the pages is completed, the job control section 201 updates the item "Job Processing Status" in the job management table 209 to "printing completed" (S2107). Finally, the job control section 201 adds a record to the job log 207 and sets the information items of the record to respective values (S2108), followed by terminating the image data input/output process.

FIG. 24 shows the configuration of a record of the job log 207 and the values set by the job control section 201 in the step S2108. The information items of the record are the same as those of the job log 107 of the image processing apparatus 1, and therefore description thereof is omitted.

An item "Record Number" is set to the record number of the added record. Items "JobID", "Job Type", "Job Reception Time", and "Fax Reception Information" are set to values of the respective associated information items in the job management table 209. An item "Image Output Destination" is set to a value (e.g. an IP address) indicative of the image processing apparatus 2, i.e. the self-apparatus (cooperation destination) that output the image data.

Items "Job End Result" and "Print Sheet Count" are set to the results of the printing executed by the image forming and output section 205. An item "Image Deletion State" indicates an image data deletion state (undeleted/deleted). At this time point, the item "Image Deletion State" is set to "undeleted". Items "Image Deletion Time" and "Image Deletion Level" are set when the item "Image Deletion State" is set to "deleted", and therefore they are set to nothing at this time point.

Figure 22A:
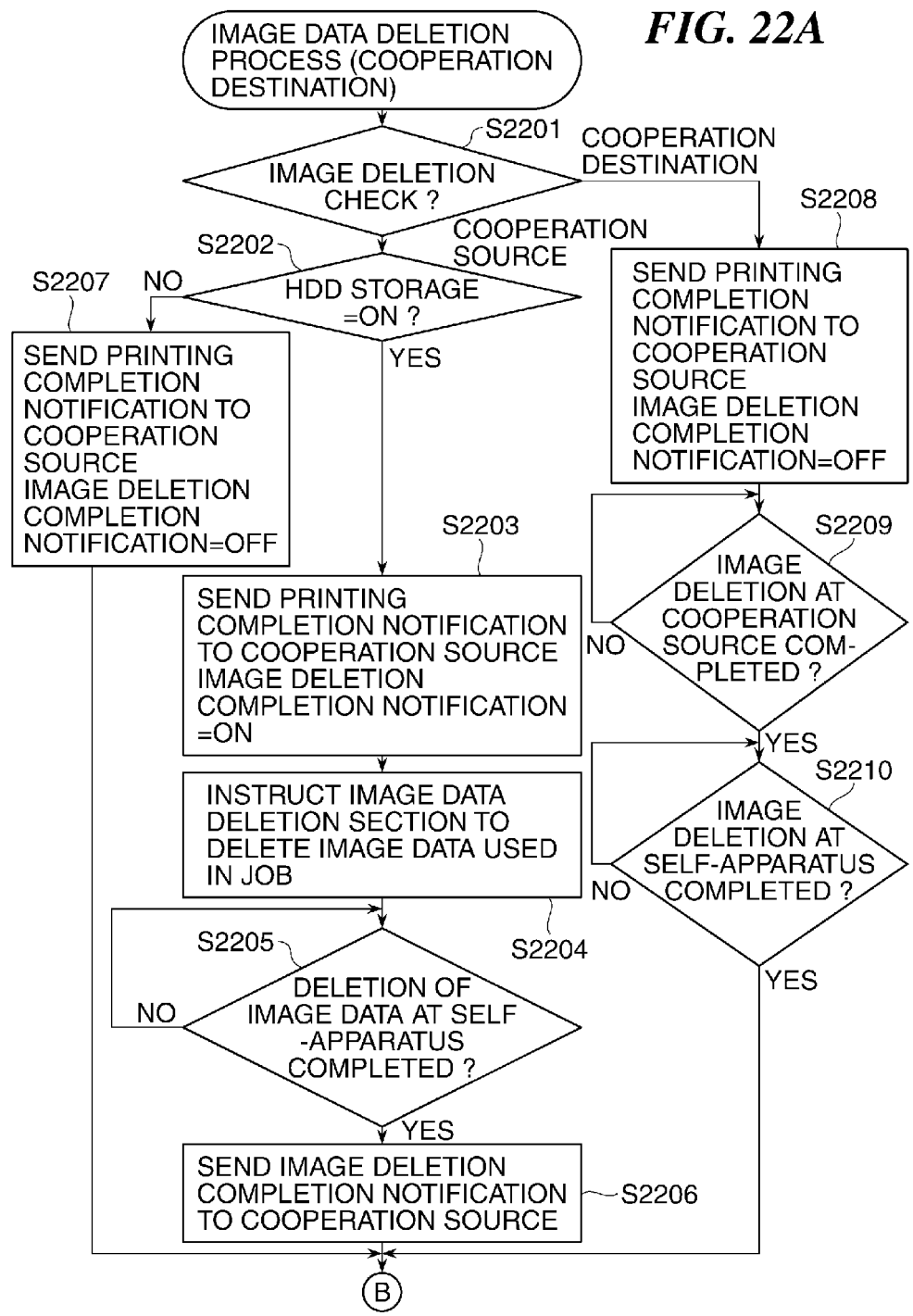

FIGS. 22A and 22B are a flowchart of the image data deletion process executed by the job control section 201 of the cooperation-destination image processing apparatus 2.

The job control section 201 refers to the item "Image Deletion Check" (cooperation source/cooperation destination) in the job management table 209 (S2201). If the item "Image Deletion Check" is set to "cooperation source", the process proceeds to a step S2202, whereas if the item "Image Deletion Check" is set to "cooperation destination", the process proceeds to a step S2208.

If "Image Deletion Check=cooperation source" in the step S2201, the job control section 201 refers to the item "HDD Storage" in the job management table 209 (S2202). If "HDD Storage"="ON", the job control section 201 sends the printing completion notification ("JobCompleted" event) to the cooperation source (S2203). At this time, the job control section 201 sets the item "Image Deletion Completion Notification" in the "JobCompleted" event to "ON".

Then, the job control section 201 instructs the image data deletion section 204 to delete the image data used in the cooperative job (S2204). At this time, the job control section 201 designates a value set as "Image Deletion Level" in the job management table 209, as an image data deletion method.

The image data deletion section 204 deletes the image data used in the cooperative job in an deletion mode corresponding to the image deletion level designated by the job control section 201. The image data deletion process by the image data deletion section 204 is executed in parallel with processing by the job control section 201.

Then, the job control section 201 awaits completion of the image deletion in the self-apparatus (image data deletion section 204) (S2205). When the deletion of the image data is completed, the job control section 201 sends an image deletion completion notification ("DeleteCompleted" event) to the cooperation-source image processing apparatus 1 (S2206).

If "HDD Storage"="OFF" in the step S2202, the job control section 201 sends the printing completion notification ("JobCompleted" event) to the cooperation source (image processing apparatus 1) (S2207). In this case, the image data is not stored in the HDD 2006 of the self-apparatus, and therefore the job control section 201 sets the item "Image Deletion Completion Notification" in the "JobCompleted" event to "OFF".

If it is determined in the step S2201 that "Image Deletion Check"="cooperation destination", the job control section 201 sends the printing completion notification ("JobCompleted" event) to the cooperation source (image processing apparatus 1) (S2208). In this case, the image deletion completion notification is sent from the cooperation source, and therefore the job control section 201 sets the item "Image Deletion Completion Notification" in the "JobCompleted" event to "OFF" (S2209).

Then, the job control section 201 awaits both arrival of the image deletion completion notification from the cooperation source (image processing apparatus 1) (S2209) and completion of the image deletion in the self-apparatus (image data deletion section 204) (S2210).

When the image deletion in the self-apparatus and the cooperation source (image processing apparatus 1) is completed, the job control section 201 updates the item "Job Processing Status" in the job management table 209 to "image deletion completed" (S2211). Then, the job control section 201 terminates the image data deletion process after updating the record of the job log 207 on the present job as follows:

"Image Deletion state"="deleted"
"Image Deletion Time"="current time"
"Image Deletion Level"=value of the item "Image Deletion Level" in the job management table 209.

Figure 25:
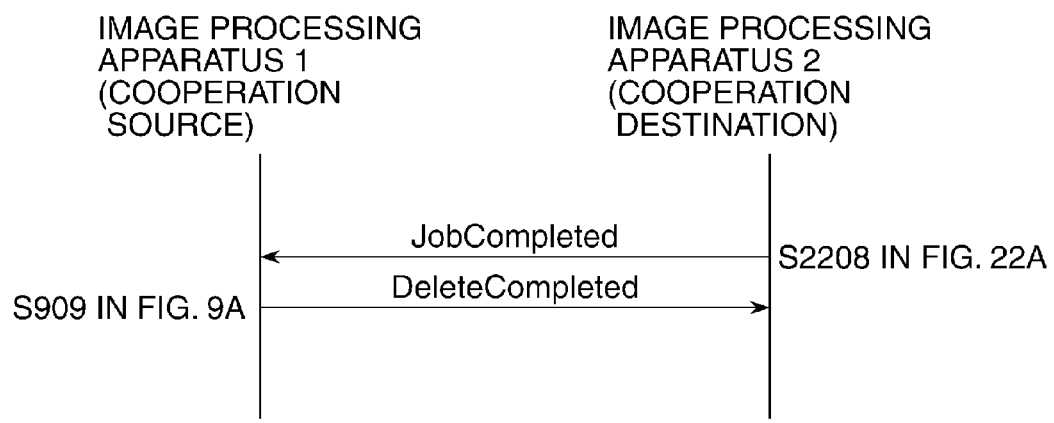
FIG. 25 is a diagram showing a sequence of sending a printing completion notification and an image deletion completion notification in the FAX reception cooperative job.

FIG. 25 shows a sequence of exchanging the printing completion notification ("JobCompleted" event) and the image deletion completion notification ("DeleteCompleted" event) in the present embodiment.

In the processing executed in the present embodiment (corresponding to the illustrated example), since "image deletion check=cooperation destination, first in the step S2208 in FIG. 22A, the printing completion notification ("JobCompleted" event) is sent from the cooperation-destination image processing apparatus 2 to the cooperation-source image processing apparatus 1. Then, in the step S909 in FIG. 9A, the image deletion completion notification ("DeleteCompleted" event) is sent from the cooperation-source image processing apparatus 1 to the cooperation-destination image processing apparatus 2.

FIGS. 26 and 27 illustrate examples of the job log 207 displayed on the operating display section 210 of the cooperation-destination image processing apparatus 2.

FIG. 26 illustrates an example of the job log 207 displayed when printing is completed by the image processing apparatus 2, i.e. when the image input/output process is terminated (S2108 in FIG. 21). The image data has not been deleted yet at this time point, and therefore "image deletion" is displayed as "self-apparatus (cooperation destination)=undeleted" and "cooperation source=undeleted".

FIG. 27 illustrates an example of the job log 207 displayed when the image data deletion process is terminated by both the image processing apparatus 1 and the image processing apparatus 2 (step S2212 in FIG. 22B). At this time point, in a case where the cooperative job is executed without storing image data in the HDD 2006, including a case where execution of the cooperative job is refused, the image data has already been deleted. Therefore, at the time point when the image data deletion process is terminated, "image deletion" is displayed as "self-apparatus (cooperation destination)=deleted" and "cooperation source=deleted".

Thus, when "image deletion check"="cooperation destination", it is possible for the user of the cooperation-destination image processing apparatus 2 to check not only deletion of the image data used in the cooperative job by the apparatus 2, but also the image data deletion state of the cooperation-source image processing apparatus 1 functioning only as a relay apparatus for data transmission, which contributes improvement of user-friendliness.

Next, a description will be given of an example of a FAX transmission cooperative job executed by the image processing system according to the present embodiment so as to send image data scanned by a cooperation-source image processing apparatus 3 (3a) to the cooperation-destination image processing apparatus 1 and causes the image processing apparatus 1 to send the image data to another apparatus by FAX transmission.

Figure 28:
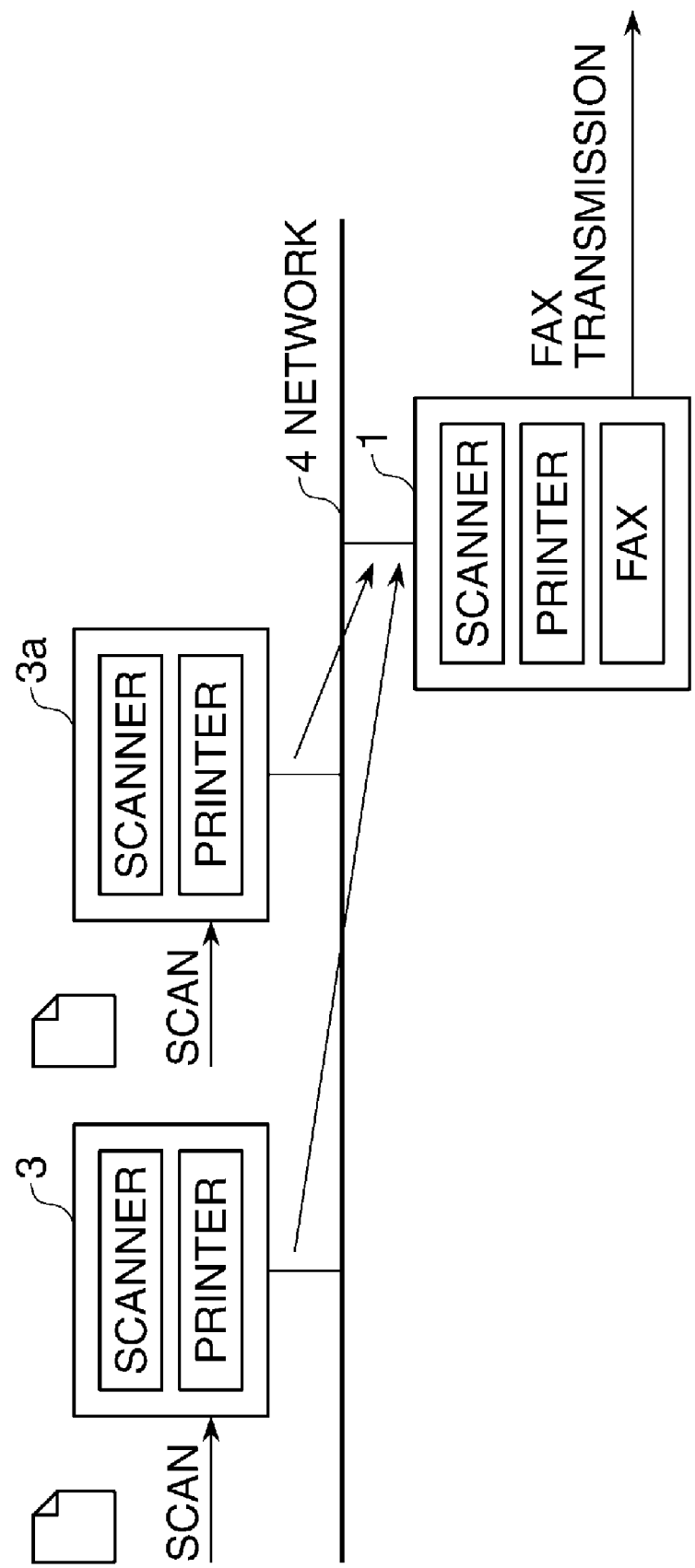
FIG. 28 is a diagram illustrating how a FAX transmission cooperative job is executed by an image processing system according to a second embodiment of the present invention.

FIG. 28 schematically illustrates how the FAX transmission cooperative job is executed is executed by an image processing system according to a second embodiment of the present invention. The image processing apparatuses 1, 3, and 3a are connected to the same network 4 to cooperate with each other to execute the FAX transmission cooperative job.

The image processing apparatuses 3 and 3a are cooperation-source image processing apparatuses, and each of them is configured as a copying machine equipped with the scan function and the print function. The image processing apparatus 1 is a cooperation-destination image processing apparatus. The image processing apparatus 1 is configured as an MFA equipped with the scan function, the print function, and the facsimile function.

The cooperation-source image processing apparatus 3 or 3a starts a FAX transmission cooperative job executed in the following procedure: The cooperation-source image processing apparatus 3 (3a) scans an original (document) for the FAX transmission and transfers scanned image data to the cooperation-destination image processing apparatus 1, and the cooperation-destination image processing apparatus 1 sends the received image data to another apparatus by FAX transmission.

Figure 29:
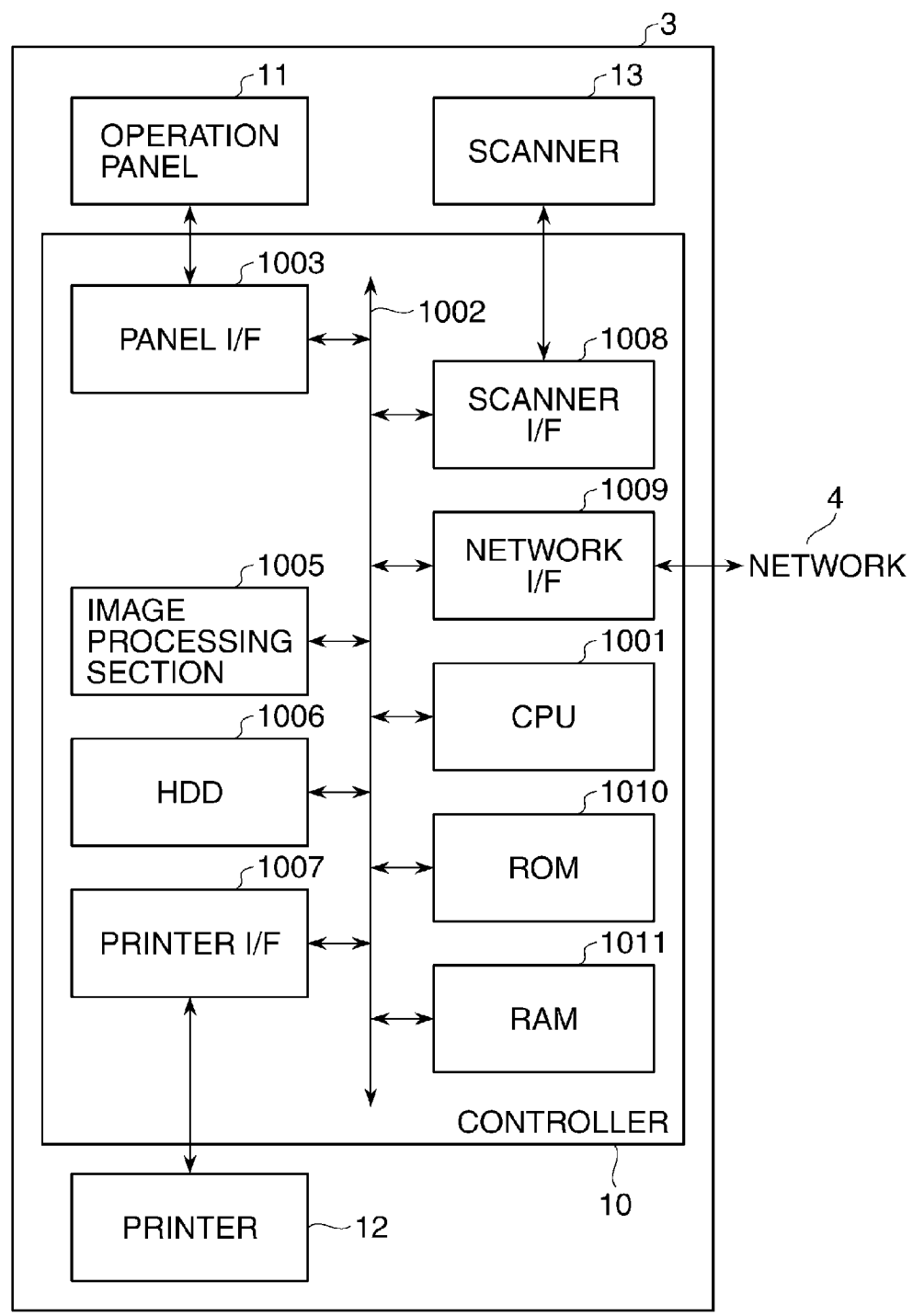
FIG. 29 is a block diagram of the hardware configuration of a cooperation-source image processing apparatus (copying machine) of the image processing system according to the second embodiment.

FIG. 29 is a block diagram of the hardware configuration of the cooperation-source image processing apparatus 3 (3a) (copying machine) in the present example shown in FIG. 28.

The hardware configuration of the image processing apparatus 3 (3a) is identical to that of the image processing apparatus 1 (see FIG. 3) except that the image processing apparatus 3 (3a) is not provided with the FAX function (FAX modem 1004), and therefore description thereof is omitted.

A detailed description will be given of a FAX transmission cooperative process executed for the FAX transmission cooperative job between the cooperation-source image processing apparatus 3 and the cooperation-destination image processing apparatus 1.

Processing steps of the FAX transmission cooperative process are substantially the same as the corresponding steps of the FAX reception cooperative process in FIG. 5. However, specific processing in the processing steps is slightly different from that in the FAX reception cooperative process. In the following, a description will be given of the difference between the FAX reception cooperative process in FIG. 5 and the present FAX transmission cooperative process.

It should be noted that in the case of giving a description of the cooperation-source image processing apparatus 3 (3a) with reference to functional blocks thereof, the reference numerals denoting the respective functional blocks in the left-hand large block (denoted by reference numeral 1) in FIG. 1 are used for convenience of description. On the other hand, the cooperation-destination image processing apparatus 1 will be described using the reference numerals denoting the respective functional blocks in the right-hand large block (denoted by reference numeral 2) in FIG. 1.

When an operation instruction for FAX transmission is input to the job control section 101 of the cooperation-source image processing apparatus 3 via the operation panel 11, a main routine substantially identical to that shown in FIG. 5 is started. Therefore, the following description is given by referring to the step numbers in FIG. 5.

First, the job control section 101 of the cooperation-source image processing apparatus 3 generates a job management table 109 and sets information items in the job management table 109 to respective values (S501).

FIG. 30 shows the configuration of the job management table 109 and the values set in the step S501. The job management table 109 is different from the job management table 109 in FIG. 11 in the following points:

An item "Job Type" is set to "FAX transmission". An item "FAX transmission information" indicates various kinds of information on FAX transmission, and the item is set e.g. to the telephone number of a transmission destination. In a FAX transmission cooperative job, it is more convenient to check image deletion at a cooperation source that performs operation for FAX transmission than at a cooperation destination, and therefore in the present example shown in FIG. 30, an item "Image Deletion Check" is set to "cooperation source".

An image data input process executed by the cooperation source in the present embodiment is similar to the image data input process in FIG. 6 in terms of processing steps. However, specific processing in the processing steps is slightly different from that in the image data input process in FIG. 6. In the following, a description will be given of the difference between the processing in the processing steps described with reference to FIG. 6 and the image data input process in the present embodiment, by referring to the step numbers in FIG. 6.

The job control section 101 of the cooperation-source image processing apparatus 3 sequentially stores image data (pages) 106 received by the image data input section 105 (scanner 13) in the storage section 103 (HDD 1006) (S601 to S602). Steps S603 to S606 are the same as those in the image data input process in FIG. 6, and therefore description thereof is omitted.

Figure 31:
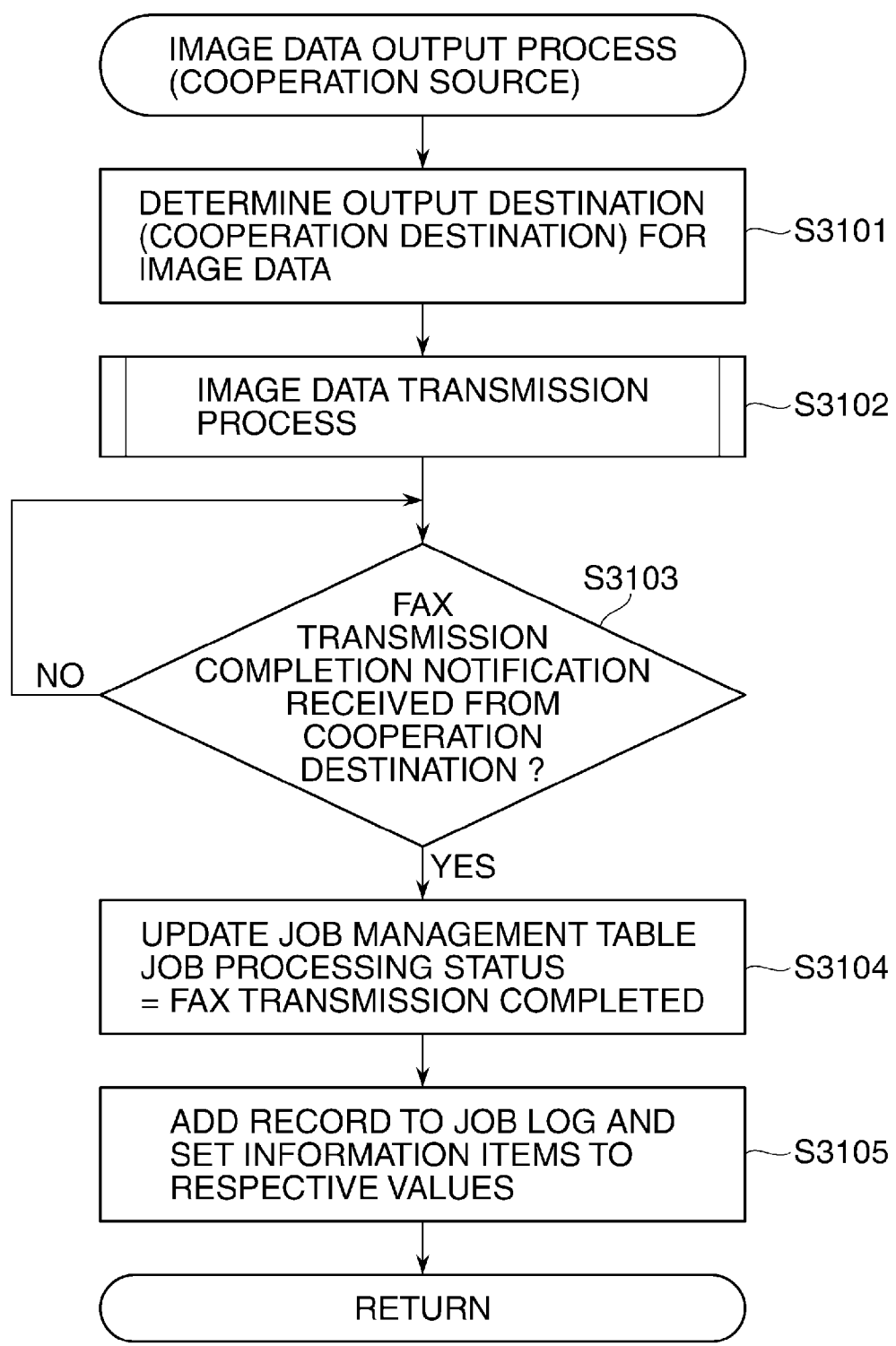
FIG. 31 is a flowchart of an image data output process executed in the FAX transmission cooperative job by the cooperation-source image processing apparatus.

FIG. 31 is a flowchart of an image data output process executed by the cooperation source in the present embodiment.

The job control section 101 of the cooperation-source image processing apparatus 3 determines an output destination (cooperation destination) for the image data and sets an item "Image Output Destination" in the job management table 109 to the determined output destination (S3101). Although various methods can be employed to determine a cooperation destination, a method in which a user sets a cooperation destination for the cooperation-source image processing apparatus 3 in advance is employed in the second embodiment. Therefore, in the step S3101, the job control section 101 sets the item "Image Output Destination" in the job management table 109 to the cooperation destination set in advance.

The job control section 101 sends the image data 106 stored in the storage section 103 to the cooperation destination (image processing apparatus 1) via the interface section 102 and the network 4 (S3102). The present image data transmission process is similar to that in FIG. 8, and therefore description thereof is omitted.

When transmission of the image data to the cooperation-destination image processing apparatus 1 is completed, the job control section 101 awaits arrival of a FAX transmission completion notification ("JobCompleted" event) from the cooperation-destination image processing apparatus 1 (S3103). This FAX transmission completion notification ("JobCompleted" event) is similar to the "JobCompleted" event described with reference to FIG. 16.

When the FAX transmission completion notification is received from the cooperation-destination image processing apparatus 1, the job control section 101 updates the job management table 109 (S3104). The job control section 101 updates an item "Job Processing Status" to "FAX transmission completed" and sets an item "Image Deletion Completion Notification from Cooperation destination" to one of values (OFF/ON) set in the FAX transmission completion notification.

Then, the job control section 101 adds a new record to a job log 107, and records a FAX transmission result of the present cooperative job (S3105), followed by terminating the image data output process.

FIG. 32 shows the configuration of a record of the job log 107 and examples of the values set by the job control section 101 in the step S1305.

The job log 107 in FIG. 32 is different from the job log 107 in FIG. 17 in that the record of the job log 107 includes an information item "FAX transmission information" in FIG. 32 in place of the item "FAX reception information" in FIG. 17 and an item "FAX Transmission Sheet Count" in FIG. 32 in place of the "Print Sheet Count" in FIG. 17. Further, the job log 107 is different from the job log 107 in that an item "Job End Result" is set to "value (status) of FAX transmission completion notification".

An image data deletion process by the cooperation source in the present embodiment is similar to the image data deletion process in FIGS. 9A and 9B. However, "Image Deletion Check"="cooperation source" in the present example, and therefore the process proceeds from the step S902 to the step S908.

A job termination process by the cooperation source in the second embodiment is identical to the corresponding job termination process in FIG. 10.

The outline of processing executed by the cooperation-destination image processing apparatus 1 for the FAX transmission cooperative job is also similar to that of the processing executed for the corresponding FAX reception cooperative process in FIG. 19.

A job reception process executed by the cooperation destination in the present embodiment is similar to the corresponding job reception process in FIG. 20 in terms of processing steps. However, processing carried out in the step S2001 in the present job reception process is slightly different from the corresponding processing in the job reception process in FIG. 20. FIG. 33 shows the differences, i.e. the configuration of a job management table 209 and values set in the step S2001. The job management table 209 is different from the job management table 209 in that "Job Type" is set to "FAX transmission" and "Image Deletion Check" to "cooperation source".

Figure 34:
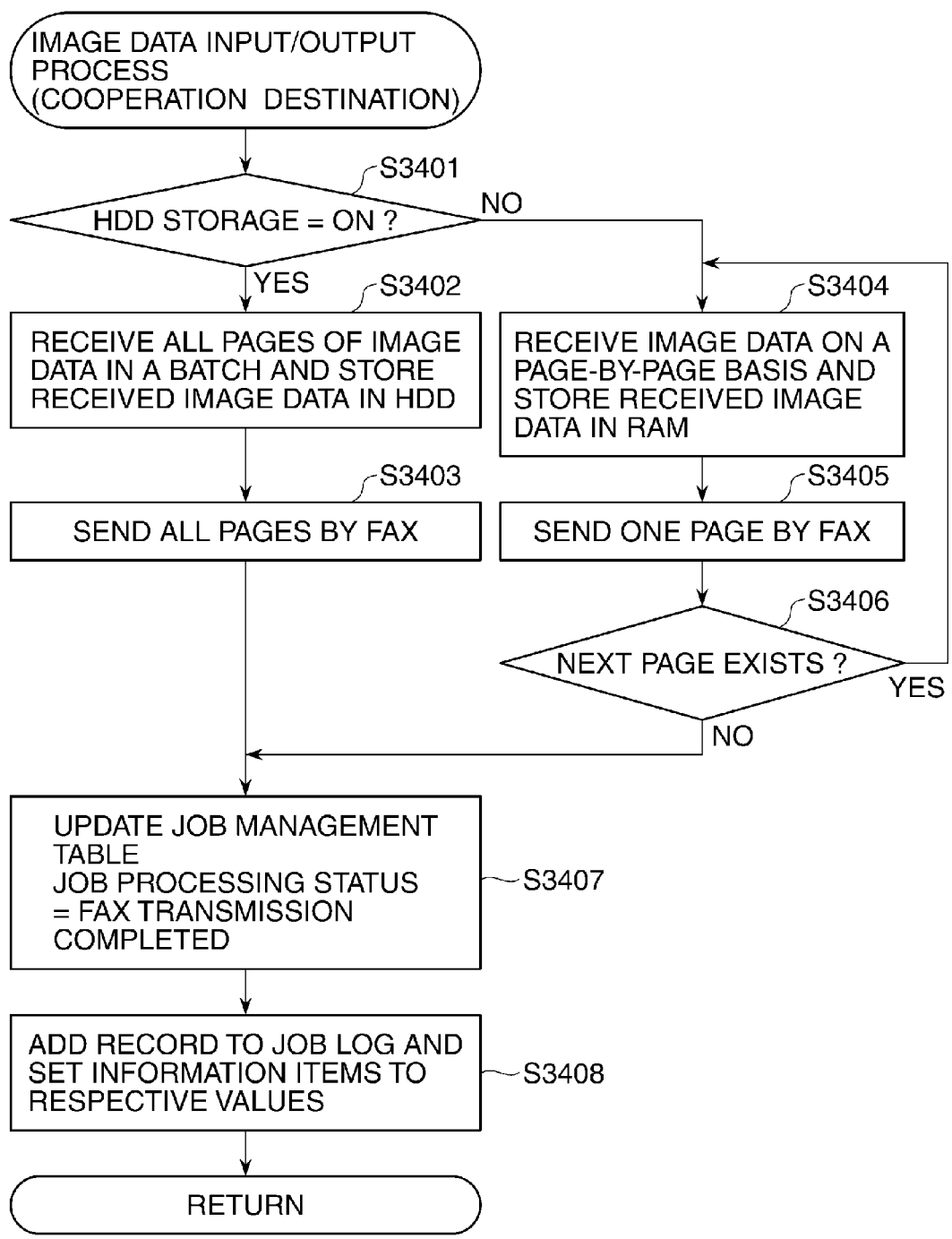
FIG. 34 is a flowchart of an image data input/output process executed in the FAX transmission cooperative job by a cooperation-destination image processing apparatus of the image processing system according to the second embodiment.

FIG. 34 is a flowchart of an image data input/output process executed by the cooperation destination in the second embodiment.

The job control section 201 of the cooperation-destination image processing apparatus 1 transmits, by FAX, all pages of image data received in a batch or sequentially on a page-by-page basis from the cooperation-source image processing apparatus 3 (S3401 to S3402 and S3403 or S3404 and S3405).

Then, the job control section 201 of the cooperation-destination image processing apparatus 1 reflects a status of reception of the image data in the job management table 209 (S3407) and records the status in a job log 207 (S3408).

FIG. 35 shows the configuration of a record of the job log 207 of the cooperation destination and values set by the job control section 201 in the step S3408. The job log 207 in FIG. 35 is different from the job log 207 in FIG. 24 in that the record of the job log 207 includes an information item "FAX transmission information" in FIG. 35 in place of the item "FAX reception information" in FIG. 24 and an item "FAX Transmission Sheet Count" in FIG. 35 in place of the "Print Sheet Count" in FIG. 24. Further, in FIG. 35, an item "Job End Result" is set to "FAX transmission result".

Figure 36A:
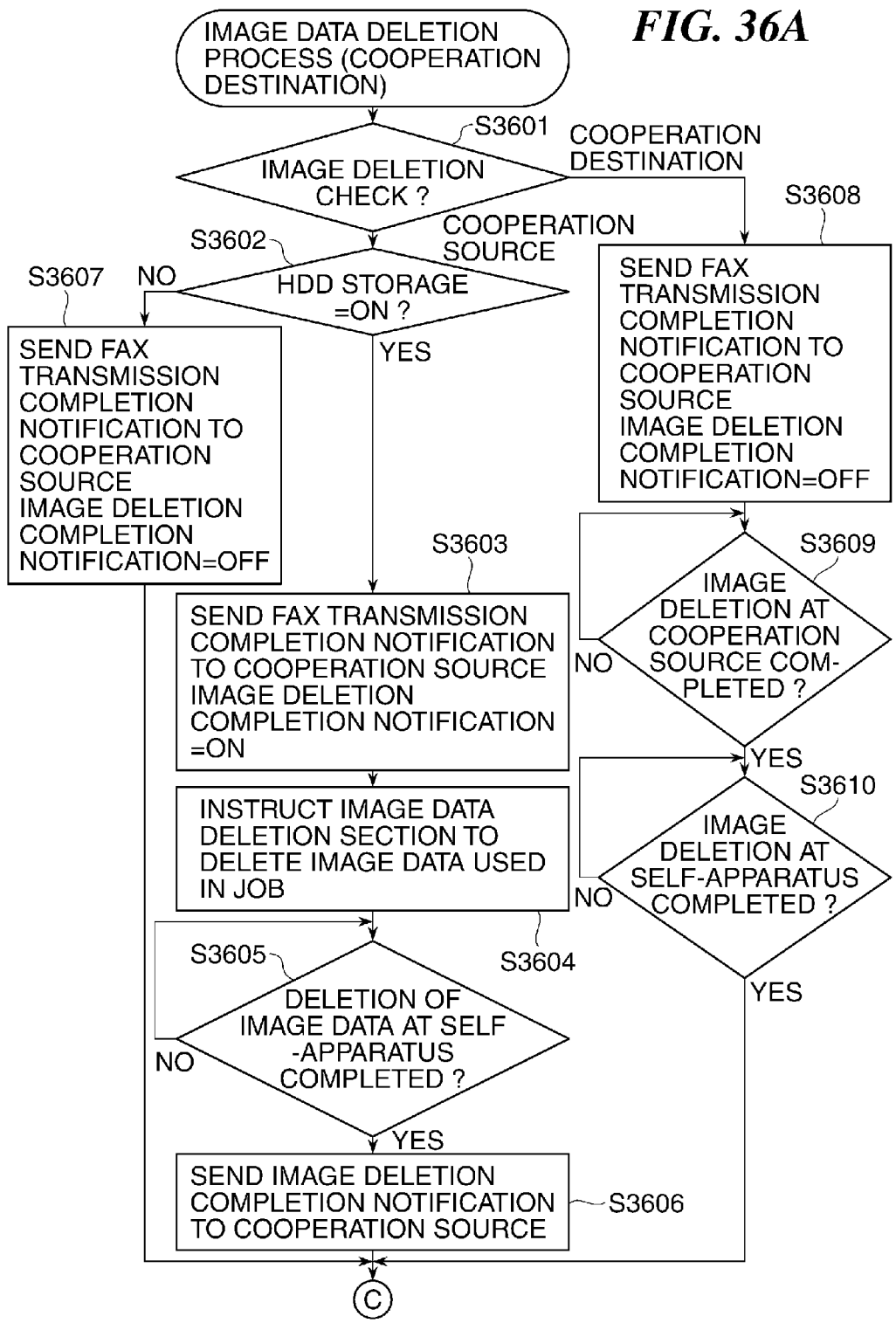
FIGS. 36A and 36B are a flowchart of an image data deletion process executed in the FAX transmission cooperative job by a job control section.
Figure 36B:
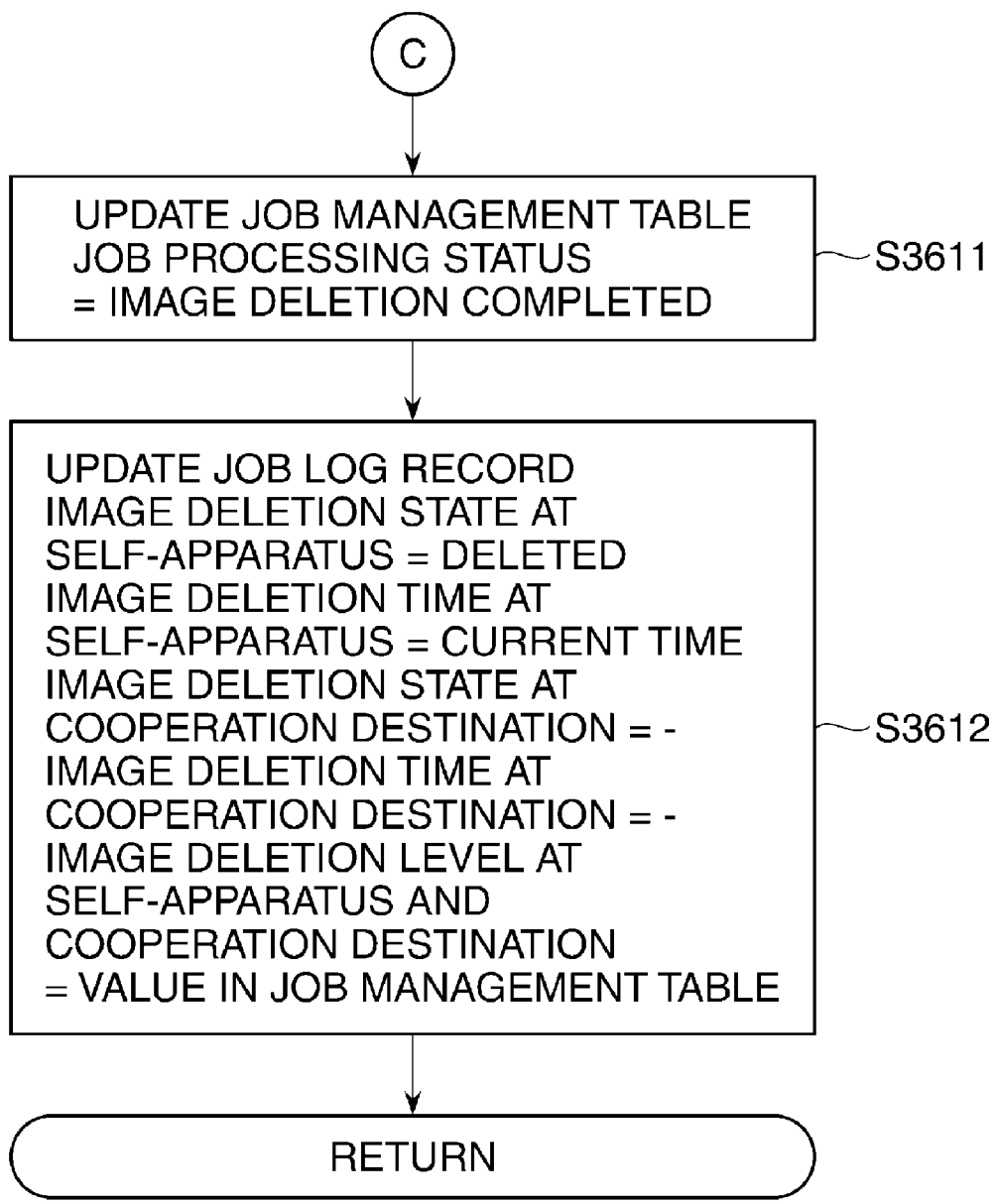

FIGS. 36A and 36B are a flowchart of an image data deletion process executed by the cooperation destination in the present embodiment. The image data deletion process in FIGS. 36A and 36B is different from that in FIGS. 22A and 22B in that a FAX transmission completion notification is sent to a cooperation source (S3603, S3607, and S3608) in place of the printing completion notification sent to a cooperation source (S2203, S2207, and S2208 in FIG. 22A).

Figure 37:
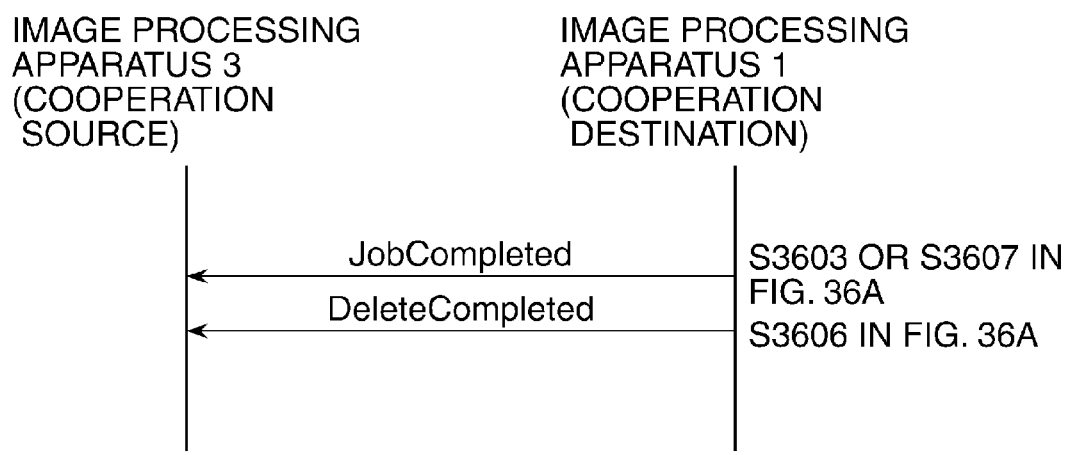
FIG. 37 is a diagram showing a sequence of sending a FAX transmission completion notification and an image deletion completion notification in the FAX transmission cooperative job.

FIG. 37 shows a sequence of sending the FAX transmission completion notification ("JobCompleted" event) and the image deletion completion notification ("DeleteCompleted" event) in the present example.

In the present example, since "Image Deletion Check"="cooperation source", first in the step S3603 (or S3607) in FIG. 36A, the FAX transmission completion notification ("JobCompleted" event) is sent from the cooperation-destination image processing apparatus 1 to the cooperation-source image processing apparatus 3.

Similarly, in a step S3606 in FIG. 36A, the image deletion completion notification ("DeleteCompleted" event) is sent from the cooperation-destination image processing apparatus 1 to the cooperation-source image processing apparatus 3.

FIGS. 38 and 39 illustrate examples of the job log 107 displayed on the operating display section 110 of the cooperation-source image processing apparatus 3.

FIG. 38 illustrates an example of the job log 107 displayed when FAX transmission by the cooperation-destination image processing apparatus 1 is completed (S3105 in FIG. 31). The image data has not been deleted yet at this time point, and therefore "image deletion" is displayed as "self-apparatus (cooperation source)=undeleted" and "cooperation destination=undeleted".

FIG. 39 illustrates an example of the job log 107 displayed when image data deletion is completed by both the cooperation-source image processing apparatus 3 and the cooperation-destination image processing apparatus 1 (step S907 in FIG. 9B). The image data has already been deleted at this time point. Therefore, image deletion results ("self-apparatus (cooperation source)"="deleted", "cooperation destination"="deleted", and "deletion time" and "deletion level") are displayed.

Thus, when "Image Deletion Check"="cooperation source", it is possible for the user of the cooperation-source image processing apparatus 3 to check not only deletion of the image data used in the cooperative job by the apparatus 3, but also image data deletion in the cooperation-destination image processing apparatus 1 functioning only as a relay apparatus for data transmission, which contributes improvement of user-friendliness.

In other words, in the present embodiment, a cooperative job is executed, with a cooperation-destination image processing apparatus as a relay apparatus for data transmission, and hence display for check of deletion of image data used in the cooperative job from a storage medium is left to a cooperation-source image processing apparatus.

This makes it possible to leave deletion check to a user at a cooperation source who can easily recognize that a cooperative job is currently being executed, and makes it unnecessary for a user at a cooperation destination, who cannot recognize execution of the cooperative job, to perform deletion check. Therefore, user-friendliness is improved.

The above-described image processing system according to the present embodiment provides the following advantageous effects:

First of all, when an image deletion level designated by a cooperation source is supported by a cooperation destination, the cooperation source and the cooperation destination can cooperate with each other to delete image data by a deletion method ensuring information security of the same level. This makes it possible to fully maintain the executability of cooperative processing of a cooperative job while maintaining information security.

On the other hand, when an image deletion level designated by a cooperation source is not supported by a cooperation destination, image data is not stored in an HDD as a nonvolatile storage medium which cannot ensure information security, so that it is possible to maintain information security at the highest possible level.

Further, in a case where an image deletion level designated by a cooperation source is not supported by a cooperation destination, when execution of a cooperative job is refused, it is impossible to maintain the executability of cooperative processing of the cooperative job, but information security can be maintained at the highest possible level.

As described above, when an image deletion level designated at a cooperation source is not supported at a cooperation destination, the actual deletion process is not executed by the cooperation destination. Even in this case, however, the deletion instruction for a cooperative job is fulfilled in a substantially most favorable manner, and therefore the executability of cooperative processing of a cooperative job can be fully maintained.

Further, in a case where a cooperation destination receives image data without using an HDD, the image data is received on a page-by-page basis and temporarily stored in a RAM that can be additionally provided at a low cost, for execution of a cooperative job. Therefore, it is possible to make substantially use of the technological idea according to the present embodiment.

Furthermore, according to the present embodiment, deletion check is performed not by an image processing apparatus functioning only as a relay apparatus for data transmission, but by the other cooperation-source or cooperation-destination image processing apparatus, i.e. an image processing apparatus via which a user can easily recognize existence of a cooperative job. This makes it possible to improve the user-friendliness of the system.

The embodiment described above in detail can be applied to any cooperative job executed by a plurality of image processing apparatuses in cooperation with each other. Further, the cooperation source and the cooperation destination are not always limited to one pair, but a plurality of cooperation destinations may exist.

The image processing apparatus to which the present invention is applied is not limited to a printer, a copying machine, or an MFP, but the technological idea according to the present embodiment can be applied to a scanner device, a facsimile machine, or a computer insofar as the device or apparatus is equipped with a network communication function.

Further, in the case of receiving image data without using an HDD, a cooperation destination can request a cooperation source at least not to send all pages of image data in a batch in place of requesting for page-by-page image data transmission. This makes it possible to suppress reduction of cooperative job execution speed while maintaining information security.

Although in the above-described embodiment, the specific storage medium in the present invention is implemented by an HDD by way of example, even if the specific storage medium is implemented by a storage medium other than an HDD, it is possible to realize the technological idea according to the present embodiment. In this case, the specific storage medium for storing image data may be incorporated in an image processing apparatus or externally (and e.g. removably) attached to the same.

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2009-046267, filed Feb. 27, 2009, which is hereby incorporated by reference herein in its entirety.

What is claimed is:

1. An image processing apparatus which functions as a destination device in a case where a single job is cooperatively executed by a plurality of image processing apparatuses, including the image processing apparatus, via a network, comprising:

a first determining unit configured to determine whether or not the image processing apparatus supports an image deletion method designated in the job by a source image processing apparatus;

a second determining unit operable in a case that said first determining unit determines that the image processing apparatus does not support the image deletion method designated by the source image processing apparatus, to determine whether or not the job can be executed without using a specific storage medium provided in the image processing apparatus; and a control unit operable, in a case that said second determining unit determines that the job can be executed without using the specific storage medium, to perform control such that the job is executed without using the specific storage medium.

2. The image processing apparatus according to claim 1, wherein when said first determining unit determines that the image processing apparatus does not support the image deletion method designated by the source image processing apparatus and in a case that said second determining unit determines that the job cannot be executed without using the specific storage medium provided in the image processing apparatus, said control unit refuses execution of the job.

3. The image processing apparatus according to claim 1, wherein in a case where said control unit performs the control such that the job is executed without using the specific storage medium, said control unit requests the source image processing apparatus not to send a plurality of pages of image data in a batch.

4. The image processing apparatus according to claim 1, wherein in a case where said control unit performs the control such that the job is executed without using the specific storage medium, said control unit requests the source image processing apparatus to send a plurality of pages of image data on a page-by-page basis.

5. The image processing apparatus according to claim 1, wherein in a case where said control unit performs the control such that the job is executed without using the specific storage medium, said control unit performs control such that the job is executed using another storage medium provided in the image processing apparatus.

6. The image processing apparatus according to claim 1, wherein said second determining unit determines whether or not the job can be executed without using the specific storage medium, irrespective of whether the specific storage medium is incorporated in the image processing apparatus or externally attached to the image processing apparatus.

7. The image processing apparatus according to claim 1, wherein, in a case that contents of the job are configured such that the image processing apparatus functions as a relay apparatus for data transmission, display for checking deletion of image data used in the job from the specific storage medium is performed by the source image processing apparatus.

8. The image processing apparatus according to claim 1, wherein the image deletion method designated by the source image processing apparatus is an image deletion method employed when deleting image data from the specific storage medium.

9. An image processing system in which a single job is cooperatively executed by a plurality of image processing apparatuses via a network, the plurality of image processing apparatuses comprising a source image processing apparatus and a destination image processing apparatus, wherein the source image processing apparatus functions as a source device for the job, and the source image processing apparatus comprises:

a designation unit configured to designate a deletion method for deleting image data associated with the job, for the destination image processing apparatus which functions as a destination device for the job, and wherein the destination image processing apparatus comprises:

a first determining unit configured to determine whether or not the destination image processing apparatus supports the deletion method designated by said designation unit;

a second determining unit operable, in a case that said first determining unit determines that the destination image processing apparatus does not support the deletion method designated by said designation unit, to determine whether or not the job can be executed without using a specific storage medium provided in the destination image processing apparatus; and a control unit operable, in a case that said second determining unit determines that the job can be executed without using the specific storage medium, to perform control such that the job is executed without using the specific storage medium.

10. A method of controlling an image processing apparatus which functions as a destination device in a case where a single job is cooperatively executed by a plurality of image processing apparatuses, including the controlled image processing apparatus, via a network, comprising:

determining whether or not the controlled image processing apparatus supports an image deletion method designated in the job by a source image processing apparatus;

determining whether or not the job can be executed without using a specific storage medium provided in the controlled image processing apparatus in a case that it is determined that the controlled image processing apparatus does not support the image deletion method designated by the source image processing apparatus; and performing control such that the job is executed without using the specific storage medium when it is determined that the job can be executed without using the specific storage medium.

11. A non-transitory computer-readable storage medium storing a program for causing a computer to execute a method of controlling an image processing apparatus which functions as a destination device in a case where a single job is cooperatively executed by a plurality of image processing apparatuses, including the controlled image processing apparatus, via a network, wherein the method comprises:

determining whether or not the controlled image processing apparatus supports an image deletion method designated in the job by a source image processing apparatus;

determining whether or not the job can be executed without using a specific storage medium provided in the controlled image processing apparatus in a case that it is determined that the controlled image processing apparatus does not support the image deletion method designated by the source image processing apparatus; and performing control such that the job is executed without using the specific storage medium when it is determined that the job can be executed without using the specific storage medium.

* * * * *